US012038697B2

(12) United States Patent
Ishio et al.

(10) Patent No.: US 12,038,697 B2
(45) Date of Patent: Jul. 16, 2024

(54) IMAGE FORMING APPARATUS

(71) Applicant: CANON KABUSHIKI KAISHA, Tokyo (JP)

(72) Inventors: Shohei Ishio, Tokyo (JP); Keisuke Ishizumi, Kanagawa (JP); Shinji Katagiri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/901,096

(22) Filed: Sep. 1, 2022

(65) Prior Publication Data

US 2023/0075235 A1 Mar. 9, 2023

(30) Foreign Application Priority Data

Sep. 8, 2021 (JP) ................................ 2021-146458

(51) Int. Cl.
*G03G 15/08* (2006.01)
*G03G 21/00* (2006.01)

(52) U.S. Cl.
CPC ..... *G03G 15/0808* (2013.01); *G03G 21/0011* (2013.01)

(58) Field of Classification Search
CPC .......... G03G 15/5058; G03G 15/5041; G03G 21/0011; G03G 15/0808
See application file for complete search history.

(56) References Cited

U.S. PATENT DOCUMENTS

| | | | | |
|---|---|---|---|---|
| 8,463,154 B2 | 6/2013 | Akizuki et al. | | |
| 2005/0041990 A1* | 2/2005 | Sugiyama | .......... | G03G 15/0194 399/49 |
| 2007/0036569 A1* | 2/2007 | Taguchi | ............ | G03G 15/0173 399/101 |
| 2007/0116483 A1* | 5/2007 | Kobayashi | ......... | G03G 15/0131 399/346 |
| 2008/0317486 A1* | 12/2008 | Monma | ............. | G03G 15/5058 399/45 |
| 2019/0049872 A1* | 2/2019 | Mori | ................. | G03G 15/0855 |

FOREIGN PATENT DOCUMENTS

| | | |
|---|---|---|
| JP | 2004-264700 A | 9/2004 |
| JP | 2009-031491 A | 2/2009 |
| JP | 2015-060196 A | 3/2015 |
| JP | 2016-130769 A | 7/2016 |

* cited by examiner

*Primary Examiner* — Sevan A Aydin
(74) *Attorney, Agent, or Firm* — Venable LLP

(57) ABSTRACT

An image forming apparatus is used, including a rotary member, on which a developer image by a developer is formed, a collection unit for collecting the developer by a blade member from a surface of the rotary member, and a control unit for controlling an image forming operation on the surface of the rotary member and a supply operation for supplying the developer to a contact portion between the rotary member and the blade member, wherein, assuming that the supply operation for supplying the developer to inside of a printable area is a first supply operation and the supply operation for supplying the developer to outside the printable area is a second supply operation, the control unit controls such that the first supply operation and the second supply operation are performed at different timing.

27 Claims, 9 Drawing Sheets

IMAGE FORMING APPARATUS

BACKGROUND OF THE INVENTION

Field of the Invention

The present invention relates to an image forming apparatus.

Description of the Related Art

Some of image forming apparatuses such as electrophotographic type copiers, printers and the like have a cleaning device which cleans a developer that has not been completely transferred to a recording material. Such a cleaning device having a constitution, in which a blade-shaped rubber member serving as a collection member is pressed onto a photosensitive drum or an intermediate transfer member so as to scrape the developer, is widely used. However, when the blade member is used for the collection member, turn-over of the blade member may occur. The turn-over refers to such a situation in which the blade member is caught in rotation of a member in contact therewith, and a distal end thereof is directed to a downstream side in a rotating direction. Thus, a constitution which prevents the turn-over has been proposed.

In Japanese Patent Application Publication No. 2016-130769, for example, such a constitution that suppresses the turn-over of the blade member by supplying a toner to outside a printable area is disclosed. And, in Japanese Patent Application Publication No. 2016-130769, the toner is collected in a storage space after collection and brought into a printable area and then, being supplied to a cleaning member from the storage space. As a result, the toner is supplied to the full surface of the cleaning member so as to suppress occurrence of the turn-over.

SUMMARY OF THE INVENTION

However, in Japanese Patent Application Publication No. 2016-130769, a dedicated device is required for supplying the toner to the full surface of the cleaning member, which makes the constitution complicated. Moreover, unlike Japanese Patent Application Publication No. 2016-130769, there is a constitution which suppresses the turn-over by supplying the toner to the printable area. However, in the case of this constitution, the toner is not supplied basically to outside the printable area. Thus, a supplied toner amount becomes different depending on a spot, which causes a spot where the toner is excessively supplied and a spot where the toner supply is small. Moreover, since the toner amount is different depending on the spot, a frictional force becomes different depending on a spot of the cleaning blade, which might cause uneven friction. If the uneven friction occurs, there is a possibility that the turn-over of the blade member may occur from that spot.

The present invention has been made in view of the aforementioned problem and has an object to suppress an adverse effect on an image caused by the cleaning device in an image forming apparatus.

The present invention provides an image forming apparatus comprising:

- a rotatable rotary member, on a surface of which a developer image by a developer supplied from a development unit is formed;
- a collection unit configured to collect the developer on the surface of the rotary member by using a blade-shaped contact member which is in contact with the surface of the rotary member; and
- a control unit configured to be able to perform control on an image forming operation for forming the developer image on the surface of the rotary member and a supply operation for supplying the developer, supplied from the development unit to the surface of the rotary member, to a contact portion between the rotary member and the contact member, wherein
- assuming that (i) the supply operation for supplying the developer to inside of a printable area, on which the developer image can be formed on the surface of the rotary member and which is in a direction orthogonal to a rotating direction of the rotary member, is a first supply operation and (ii) the supply operation for supplying the developer to outside the printable area is a second supply operation, the control unit executes control such that the first supply operation and the second supply operation are performed at different timings.

According to the present invention, in the image forming apparatus, an adverse effect on an image caused by the cleaning device can be suppressed.

Further features of the present invention will become apparent from the following description of exemplary embodiments with reference to the attached drawings.

DESCRIPTION OF THE EMBODIMENTS

Hereinafter, by referring to the figures, embodiments for working this invention will be exemplarily described in detail on the basis of embodiments. However, dimensions, materials, shapes, relative layouts thereof and the like of components described in the embodiments should be changed as appropriate depending on constitutions or various conditions of apparatuses to which the invention is applied unless there is particularly specific description. That is, they are not intended to limit a scope of this invention to the following embodiments.

Embodiment 1

Apparatus Constitution

Figure 1:
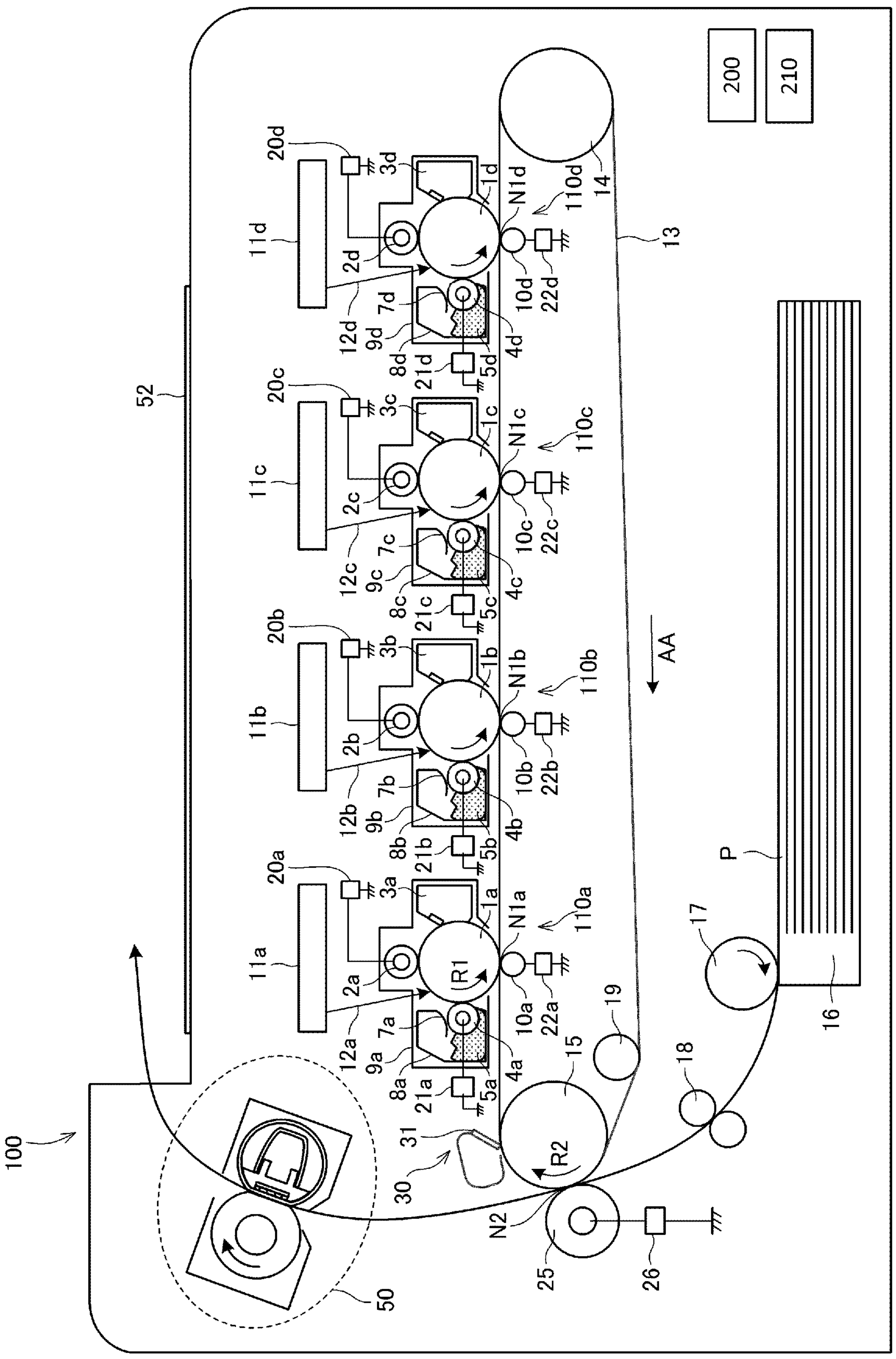
FIG. 1 is an overall diagram of an apparatus of Embodiment 1.

FIG. 1 is a schematic sectional view illustrating a constitution of an image forming apparatus 100 of this Embodiment. The image forming apparatus 100 of this Embodiment is a so-called tandem-type image forming apparatus in which a plurality of image forming units 110a to 110d are provided. An image is formed in toners in each color, that is, the first image forming portion 110a in yellow (Y), the second image forming portion 110b for magenta (M), the third image forming portion 110c for cyan (C), and the fourth image forming portion 110d for black (Bk). The four image forming portions are disposed in one row at certain intervals, and the constitution of each of the image forming units shares many parts substantially in common, except the color of the toner to be accommodated. Therefore, hereinafter, the image forming apparatus 100 will be described by using the first image forming portion 110a.

Suffixes (a to d) of signs indicating constituent elements indicate the corresponding image forming units. For example, a photosensitive drum 1a is included in the first image forming unit 110a. However, if there is no need to discriminate colors, the suffixes (a to d) are omitted such as the "photosensitive drum 1" in some cases.

The photosensitive drum 1a as an image bearing member is constituted by a plurality of layers of functional organic materials such as a carrier generation layer which is exposed to light and generates an electric charge, an electric-charge transport layer which transports the generated electric charge and the like laminated on a metal cylinder, and an outermost layer has low electric conductivity and is substantially insulating. The photosensitive drum 1a rotates at a predetermined peripheral speed in an illustrated arrow R1 direction upon receipt of a driving force from a driving source, not shown.

A charging roller 2a as a charging member is brought into contact with the photosensitive drum 1a and uniformly charges a surface of the photosensitive drum 1a while being driven/rotated with rotation of the photosensitive drum 1a shown in the illustrated arrow R1 direction. The charging roller 2a charges the photosensitive drum 1a by discharge generated in a slight air gap on upstream/downstream of a charging portion where the charging roller 2a and the photosensitive drum 1a are brought into contact by application of a DC voltage from a charging power source 20a.

A development unit 8a has a developing roller 4a as a developing member and a developer application blade 7a and accommodates a yellow toner 5a. The developing roller 4a is connected to a developing power source 21a. Moreover, a cleaning unit 3a has a cleaning blade in contact with the photosensitive drum 1a and a waste toner box accommodating a toner removed from the photosensitive drum 1a by the cleaning blade and the like and collects the toner remaining on the photosensitive drum 1a.

An exposure unit 11a is constituted by a scanner unit which causes a polygon mirror to be scanned and emits a scanning beam 12a modulated on the basis of an image signal to the photosensitive drum 1a. Note that, the photosensitive drum 1a, the charging roller 2a, the cleaning unit 3a, and the development unit 8a are constituted as an integral process cartridge 9a detachably attached to the image forming apparatus 100. The exposure unit may be shared by each color.

An intermediate transfer belt 13 as an intermediate transfer member is extended by three rollers, that is, a secondary transfer opposed-roller 15 (hereinafter, referred to as an opposed roller 15), a tension roller 14, and an auxiliary roller 19 as extending members. The tension roller 14 is biased by a spring, not shown, so that an appropriate tension force for the intermediate transfer belt 13 is maintained. The opposed roller 15 rotates in an illustrated arrow R2 direction upon receipt of the driving force from a driving source, not shown, and the intermediate transfer belt 13 moves in an illustrated arrow AA direction with the rotation of the opposed roller 15. The intermediate transfer belt 13 is capable of rotation at substantially the same speed in a forward direction with respect to the photosensitive drums 1a to 1d.

The auxiliary roller 19, the tension roller 14, and the opposed roller 15 are electrically grounded. The opposed roller 15 is a roller with an outer diameter of 24.0 mm formed by coating a core metal made of aluminum with an EPDM rubber with a thickness of 0.5 mm. Carbon is dispersed as a conducting agent in the EPDM rubber so that an electric resistance value of the opposed roller 15 is approximately 1×105Ω.

A primary transfer roller 10a is provided at a position opposed to the photosensitive drum 1a through the intermediate transfer belt 13, in contact with an inner peripheral surface of the intermediate transfer belt 13, and is driven/rotated with movement of the intermediate transfer belt 13.

A secondary transfer roller 25 is provided at a position opposed to the opposed roller 15 through the intermediate transfer belt 13 and is in contact with an outer peripheral surface of the intermediate transfer belt 13. Moreover, the secondary transfer roller 25 is connected to a secondary transfer power-source 26.

A controller portion 200 is a control device capable of communication with a host computer outside the image forming apparatus and an engine control portion 210, which will be described later. The control portion 210 is a control device capable of communication by being connected to the controller portion 200 and each constituent element in the image forming apparatus by a control line, not shown, or wirelessly and controls an operation of each constituent element of the apparatus in accordance with an instruction of a program or a user. As the controller portion 200 and the engine control portion 210, a processing circuit such as FPGA, ASIC and the like or an information processing device including calculation resources such as a CPU, a memory and the like is suitable. Inside or outside the controller portion 200 or the engine control portion 210, a memory, which is temporary or permanent storage means storing various types of control information may be provided. The controller portion 200 and the engine control portion 210 may be considered altogether as a control unit which controls an operation of the image forming apparatus 100. For example, control related to conveyance of a transfer material P, control related to driving of the intermediate transfer belt 13 and the process cartridge 9, control related to image formation, control related to failure detection and the like are executed. The control unit practicably controls the image forming operation and a supply operation of supplying a toner 5 supplied to a surface of the intermediate transfer belt 13 (a rotary member in this embodiment) from the development unit 8 to a contact portion between the intermediate transfer belt 13 and a cleaning blade 31.

Image Forming Operation

Subsequently, an image forming operation of the image forming apparatus 100 of this embodiment will be described. When the control unit receives an image signal, the image forming operation is started, and the photosensitive drums 1a to 1d, the opposed roller 15 and the like start rotation at a predetermined peripheral speed (process speed) by a driving force from a driving source, not shown. In this embodiment, the process speed is 200 mm/s.

The photosensitive drum 1a is uniformly charged by the charging roller 2a to which a voltage with the same polarity as a regular charging polarity of the toner 5a (negative polarity in this embodiment) from the charging power source 20*a* was applied. After that, when the scanning beam 12*a* is emitted from the exposure unit 11*a*, an electrostatic latent image in compliance with image information is formed on a surface of the photosensitive drum 1*a*.

The toner 5*a* accommodated in the development unit 8*a* is charged to a negative polarity by the developer application blade 7*a* and is applied to the developing roller 4*a*. Then, by applying a predetermined voltage from the developing power source 21*a* to the developing roller 4*a*, the electrostatic latent image is developed by the toner 5*a* on a development portion where the developing roller 4*a* and the photosensitive drum 1*a* are in contact, and the toner image (developer image) corresponding to a yellow image component is formed on the photosensitive drum 1*a*.

After that, the yellow toner image carried by the photosensitive drum 1*a* reaches a primary transfer portion N1*a* where the photosensitive drum 1*a* and the intermediate transfer belt 13 are in contact with the rotation of the photosensitive drum 1*a*. Then, by applying a voltage of a positive polarity from the primary transfer power source 22*a* to the primary transfer roller 10*a*, the yellow toner image is primarily transferred in the primary transfer portion N1*a* from the photosensitive drum 1*a* to the intermediate transfer belt 13.

Hereinafter, similarly, a magenta toner image in a second color, a cyan toner image in a third color, and a black toner image in a fourth color are formed by the second, third, and fourth image forming portions 110*b, c, d* and are primarily transferred to the intermediate transfer belt 13 by being sequentially overlapped. As a result, a toner image in four colors corresponding to the intended color image is formed on the intermediate transfer belt 13.

After that, the toner image in four colors carried by the intermediate transfer belt 13 is secondarily transferred in a lump sum on a surface of the transfer material P such as paper, an OHP sheet or the like in a process of passing through a secondary transfer portion N2 formed by contact between the secondary transfer roller 25 and the intermediate transfer belt 13. At this time, by applying a voltage of a positive polarity from the secondary transfer power-source 26 to the secondary transfer roller 25, the toner image is secondarily transferred to the transfer material P from the intermediate transfer belt 13 in the secondary transfer portion N2. Here, the transfer control executed by the engine control portion 210 from the intermediate transfer belt to the transfer material P is called secondary transfer control.

The transfer material P such as paper is accommodated in a paper-feed cassette 16, and after it is fed by a paper-feed roller 17 from the paper-feed cassette 16 toward a conveyance roller 18, it is conveyed by the conveyance roller 18 toward the secondary transfer portion N2. And the transfer material P to which the toner image in four colors was transferred in the secondary transfer portion N2 is heated and pressurized in a fixing unit 50, whereby the toners in four colors are molten/mixed and fixed to the transfer material P. After that, the transfer material P is ejected from the image forming apparatus 100 and is loaded on a paper ejection tray 52 as a loading portion.

The transfer residual toner remaining on the intermediate transfer belt 13 after the secondary transfer is removed from the surface of the intermediate transfer belt 13 by a belt cleaning unit 30 (collection unit) provided opposite to the opposed roller 15 through the intermediate transfer belt 13. Though it will be described later in detail, the belt cleaning unit 30 has the cleaning blade 31 (blade-shaped contact member) brought into contact with the outer peripheral surface of the intermediate transfer belt 13 at a position opposed to the opposed roller 15.

In the image forming apparatus 100 in this embodiment, a full-color print image is formed by the aforementioned operations.

Cleaning Constitution

Figure 2A:
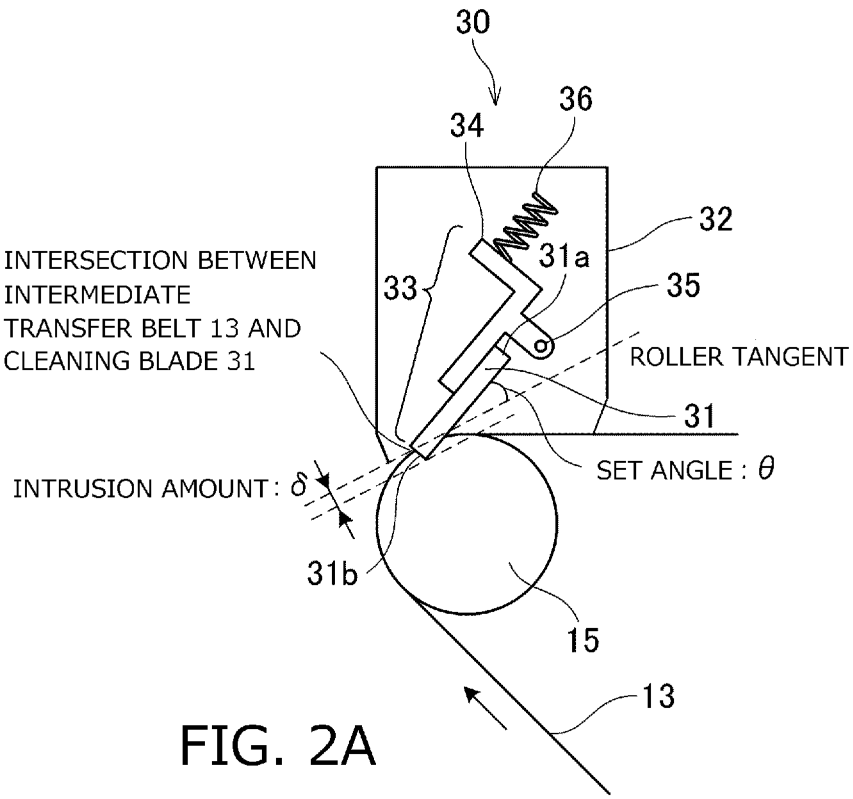
FIG. 2A and FIG. 2B are installation diagrams of a cleaning blade in Embodiment 1.
Figure 2B:
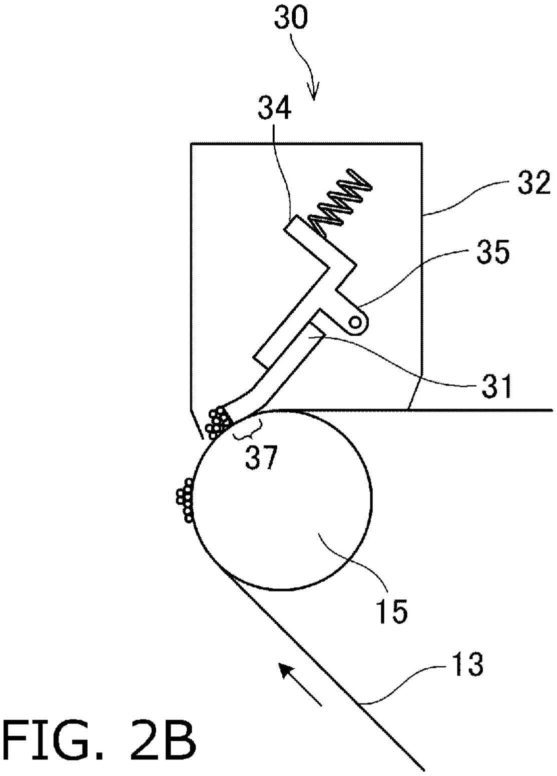

Subsequently, a constitution of the belt cleaning unit 30 will be described. FIG. 2A is a virtual sectional view describing a mounting position of the cleaning blade 31 when the cleaning blade 31, which will be described later, is not elastically deformed. FIG. 2B is a schematic sectional view describing the structure of the belt cleaning unit 30.

The belt cleaning unit 30 has a cleaning container 32 and a cleaning action portion 33 provided in the cleaning container 32. The cleaning container 32 is constituted as a part of a frame body of an intermediate transfer unit having the intermediate transfer belt 13 and the like. The cleaning action portion 33 has the cleaning blade 31 as a cleaning member (contact member) and a support member 34 which supports the cleaning blade 31. The cleaning blade 31 is an elastic blade constituted by urethane rubber (polyurethane), which is an elastic material, and is supported in a state bonded to the support member 34 formed of a sheet metal with a galvanized steel plate as a material.

The cleaning blade 31 is a plate-shaped member, which is long in a width direction (longitudinal direction of the cleaning blade 31) of the intermediate transfer belt 13 crossing a moving direction (hereinafter referred to as a belt conveyance directions) of the intermediate transfer belt 13. Moreover, the cleaning blade 31 has an end portion 31*b* on a free-end side brought into contact with the intermediate transfer belt 13 with respect to a shorter direction and is fixed in a state with an end portion 31*a* on a fixed-end side bonded to the support member 34. In this embodiment, a length of the cleaning blade 31 in the longitudinal direction is 240 mm, a thickness is 2 mm, and hardness of the cleaning blade 31 is 77 degrees in the JIS K 6253 standard.

The cleaning action portion 33 is constituted capable of swing with respect to the surface of the intermediate transfer belt 13. That is, the support member 34 is supported capable of swing with respect to the surface of the intermediate transfer belt 13 through a swing shaft 35 fixed to the cleaning container 32. When the support member 34 is pressurized by a pressurizing spring 36 as biasing means provided in the cleaning container 32, the cleaning action portion 33 is moved around the swing shaft 35, and the cleaning blade 31 is biased (pressed) onto the intermediate transfer belt 13.

Opposed to the cleaning blade 31, the opposed roller 15 is disposed on an inner peripheral side of the intermediate transfer belt 13. The cleaning blade 31 is brought into contact with the surface of the intermediate transfer belt 13 at a position opposed to the opposed roller 15 in a counter direction with respect to the belt conveyance direction. That is, the cleaning blade 31 is brought into contact with the surface of the intermediate transfer belt 13 so that the end portion 31*b* on the free-end side in the short direction thereof is directed to an upstream side with respect to the belt conveyance direction. As a result, as shown in FIG. 2B, a blade nip portion 37 is formed between the cleaning blade 31 and the intermediate transfer belt 13. The cleaning blade 31 scrapes the transfer residual toner from the surface of the moving intermediate transfer belt 13 and collects it in the cleaning container 32 in the blade nip portion 37.

In this embodiment, a mounting position of the cleaning blade 31 is set as follows. In FIG. 2A, a set angle θ is 22°, an intrusion amount δ is 1.3 mm, and a contact pressure is 0.6 N/cm. Here, the setting angle θ is an angle formed by a tangent line of the opposed roller 15 at an intersection between the intermediate transfer belt 13 and the cleaning blade 31 (in more detail, an end surface on the free-end side thereof) and the cleaning blade 31 (in more detail, a surface of one of those substantially orthogonal in a thickness direction thereof). Moreover, the intrusion amount δ is a length in the thickness direction where the cleaning blade 31 overlaps the opposed roller 15. Moreover, the contact pressure is defined as a pressing force (linear pressure in the longitudinal direction) from the cleaning blade 31 in the blade nip portion 37 and is measured by using a film-type pressurizing force measurement system (product name: PINCH, by Nitta Corporation).

Moreover, urethane rubber and a synthetic resin have large frictional resistance by sliding in general, and initial turn-over of the cleaning blade 31 can occur easily. Thus, it is preferable that an initial lubricant such as graphite fluoride or the like is applied in advance to the end portion 31*b* on the free-end side of the cleaning blade 31.

Though selection is made as appropriate depending on a material or the like of the intermediate transfer belt 13, rubber hardness of the cleaning blade 31 is preferably 70 degrees or more and 80 degrees or less in the JIS K 6253 standard. Moreover, the contact pressure of the cleaning blade 31 is preferably in a range from 0.4 N/cm or more to 0.8 N/cm or less.

Intermediate Transfer Belt Constitution

Subsequently, a constitution of the intermediate transfer belt 13 in this embodiment will be described. The intermediate transfer belt 13 is an endless-state belt member (or a film-state member) made of two layers, that is, a base layer and a surface layer, and a peripheral length of the intermediate transfer belt 13 is 700 mm. Here, the base layer is defined to be a thickest layer in the layers constituting the intermediate transfer belt 13 with respect to the thickness direction of the intermediate transfer belt 13. In this embodiment, the base layer 41 is a layer with a thickness of 70 μm. Moreover, the surface layer 40 is formed on an outer peripheral surface side of the intermediate transfer belt 13 and is a layer with a thickness of 3 μm.

As described above, in this constitution, friction is generated between the cleaning blade 31 and the intermediate transfer belt 13. When a surface property of the intermediate transfer belt 13 is smooth, the frictional force becomes high, and the cleaning blade 31 is caught in the rotating direction of the intermediate transfer belt 13 due to this frictional force, and the cleaning blade 31 is turned over in some cases.

The turn-over here refers to such a state where, though blade nip portion 37 should have been formed in a state where the end portion 31*b* on the free-end side of the cleaning blade 31 extends to the upstream side in the conveyance direction on the surface of the intermediate transfer belt 31 as in FIG. 2B at a normal time, the end portion 31*b* on the free-end side is caught by progress of the intermediate transfer belt 31 surface due to the frictional force and is directed to the downstream side in the conveyance direction. The turn-over can occur on the entire blade or can occur partially depending on unevenness of the frictional force in the longitudinal direction of the cleaning blade 31. Moreover, the turn-over which occurred partially can affect the entire blade in some cases.

In order to prevent the turn-over of the cleaning blade 31, the frictional force is preferably reduced. Methods for reducing the frictional force include, other than the aforementioned method of applying the lubricant to the cleaning blade 31, a method of supplying a toner to the cleaning blade 31. That is, it is a method of preventing the turn-over of the cleaning blade 31 by reducing the frictional force through supply of a toner to the entire spot where the cleaning blade 31 and the intermediate transfer belt 13 are in contact so as to prevent the frictional force to become higher locally.

Method of Supplying Toner to Blade

Major methods of supplying the toner to the cleaning blade 31 will be described. First, there is a method of collecting the residual toner that could not be transferred to the transfer material P during print but remained on the intermediate transfer belt 13. Secondly, there is a method of collecting the toner printed on the intermediate transfer belt 13 by the cleaning blade 31 not by allowing transfer to the transfer material P but by allowing it to pass the secondary transfer roller 25. Particularly, the latter is performed for the purpose of supplying the toner to the cleaning blade 31. The operation as above performed in order to supply the toner from the developing member to the cleaning blade 31 is called toner purge (toner supply). This toner supply will be described in detail later.

With the first toner supply method, that is, the method of collecting the transfer residual toner, a toner amount to be supplied is varied depending on a print pattern. Moreover, the toner supply is performed the residual toner to the printable area to be printed, but the toner is not supplied to a spot outside the printable area. However, in order to reduce unevenness of the frictional force by supplying the toner to the entire contact portion between the cleaning blade 31 and the intermediate transfer belt 13, such a constitution is preferable that the toner is supplied uniformly to the entire cleaning blade 31. Therefore, a large amount of toner is preferably supplied to an area outside the printable area where there is no toner supply by print.

Thus, in this embodiment, optimal toner supply is performed to the entire cleaning blade 31 by controlling the toner supply performing the toner supply to the cleaning blade 31 with an optimal method. Specifically, as a toner supply mode performing the toner supply from the developing portion, there are two types of modes, that is, "toner supply in the printable area" in which the toner supply is performed mainly in the printable area and "toner supply outside the printable area" in which the toner supply is performed mainly outside the printable area. That is, in this embodiment, executability of the toner supply in the printable area (first supply operation) and the toner supply outside the printable area (second supply operation) is determined for the supply of the toner 5.

Here, the term of within the printable area refers to a maximum image range for which a user of the image forming apparatus can set print as a print image. For example, when a printable size as the image forming apparatus is a letter size (width of 216 mm), and when an area where the user can specify print is an inner area with a margin of 5 mm, it is the area with the width of 206 mm excluding 5 mm on both ends of the letter size. The printable area is located in center area in a direction orthogonal to the rotating direction of the intermediate transfer belt.

The term of outside the printable area is an area outside the aforementioned within the printable area and an area to the end portion of the cleaning blade. Here, it is supposed that a width of the contact portion of the cleaning blade 31 in this embodiment is 240 mm. In this case, in the image forming apparatus with the width of the aforementioned printable area (area for which the user can specify print) of 206 mm, with the cleaning blade 31 of this embodiment, an area outside the printable area of 206 mm and contained in the contact portion of the cleaning blade 31 of 240 mm is outside the printable area.

Note that the developing roller 4 cannot supply the toner to the length of the entire contact portion of the cleaning blade 31 in some cases. In that case, a width up to a development opening capable of the toner supply is an execution width of the toner supply. In this embodiment, the development opening width is 230 mm, which is supposed to be smaller than the width of the contact portion of the cleaning blade 31, which is 240 mm. Therefore, from the width 206 mm of inside the printable area to the width of 230 mm of the development opening is the toner supply area outside the printable area. A remaining space from 230 mm to 240 mm of the cleaning blade contact region is consumed by a portion in which the collected toner moves laterally when the cleaning blade 31 receives the toner supply.

Details of Toner Supply

In this embodiment, by providing different execution conditions for the two types of toner supply modes, that is, the toner supply in the printable area and the toner supply outside the printable area, the optimal toner amount is supplied to the entire cleaning blade. Hereinafter, the detailed toner supply method will be described.

At the toner supply, too, the control similar to that during the print is executed to the middle. That is, first, the photosensitive drum 1 is charged, the scanning beam 12 is emitted by the exposure unit 11 in accordance with an area to which the toner is to be supplied, and the toner image is formed from the developing roller 4. After that, a voltage of the positive polarity is applied to the primary transfer roller 10, and the toner image formed on the photosensitive drum 4 is primarily transferred to the intermediate transfer belt 13. So far is processing similar to ordinary print.

Then, in the toner supply, the toner image on the intermediate transfer belt 13 is passed through the secondary transfer portion N2 and is supplied to the cleaning blade 31. A voltage of the negative polarity is applied to the secondary transfer roller 25 so that the toner image is passed through the secondary transfer portion N2. As a result, unlike the ordinary print, the toner image formed on the intermediate transfer belt 13 passes through the secondary transfer portion N2 and is collected by the cleaning blade 31. That is, the toner is supplied to the cleaning blade 31. This operation until the toner is supplied to the cleaning blade 31 is the toner supply.

Note that, in the toner supply, the toner is supplied to the area outside the ordinary printable area in some cases. In this case, the scanning beam 12 of laser irradiation is forcedly emitted so as to perform the laser irradiation also to outside the printable area, and the toner is supplied from the developing roller 4.

A suitable execution timing of the toner supply is a period during a post-rotation operation after the print is finished and the print image is ejected until the operation of the printer is stopped. One of the reasons is that the execution of the toner supply in the printable area during print is difficult. Another reason is that, if the toner supply is executed before the print or between sheets at print, there is possibility that a print speed slows, but the print speed is not affected during the post-rotation operation after the print is finished.

The toner image transferred at execution of the toner supply in this embodiment will be described. A width of the toner image for toner supply in a direction orthogonal to the conveyance direction of the intermediate transfer belt 13, that is, the width direction of the intermediate transfer belt 13 is supposed to be the aforementioned width in the printable area in the case of the toner supply in the printable area, while it is the width of the aforementioned outside the printable area in the case of the toner supply outside the printable area.

Subsequently, a suitable length of the toner image for toner supply in the rotating direction of the intermediate transfer belt 13 will be described. If the supplied toner amount is too small, an effect of a lowered friction coefficient as the toner supply cannot be exerted, while, if the supplied toner amount is too large, there is a possibility that the cleaning cannot be completed but defective cleaning can occur. In the case of the defective cleaning, an image is not directly affected if it is outside the printable area, but a gap is generated at a spot where the defect occurs. And a foreign substance such as paper powder or the like is caught in the gap, which enlarges the defective cleaning region, and defective cleaning could occur even in the printable area. Thus, in this embodiment, in order to lower the frictional force to the limit where the defective cleaning does not occur, the length of the toner image was set to a range from 5 mm or more to 100 mm or less.

Specifically, in this embodiment, both in the case of the toner supply in the printable area and in the case of the toner supply outside the printable area, a toner image for toner supply with a length of 40 mm in total is formed regardless of the color. Moreover, the same toner image in all the four colors is transferred from the viewpoint of a consumption amount. As described above, in this embodiment, both in the case of the toner supply in the printable area and in the case of the toner supply outside the printable area, the toner image with a length of 10 mm in each color is formed in the rotating direction of the intermediate transfer belt 13. Then, during the post-rotation operation of the image forming apparatus, a solid patch of the toner image for toner supply with the length of 10 mm in each color is transferred to the intermediate transfer belt 13 and is supplied to the cleaning blade 31.

Figure 3B:
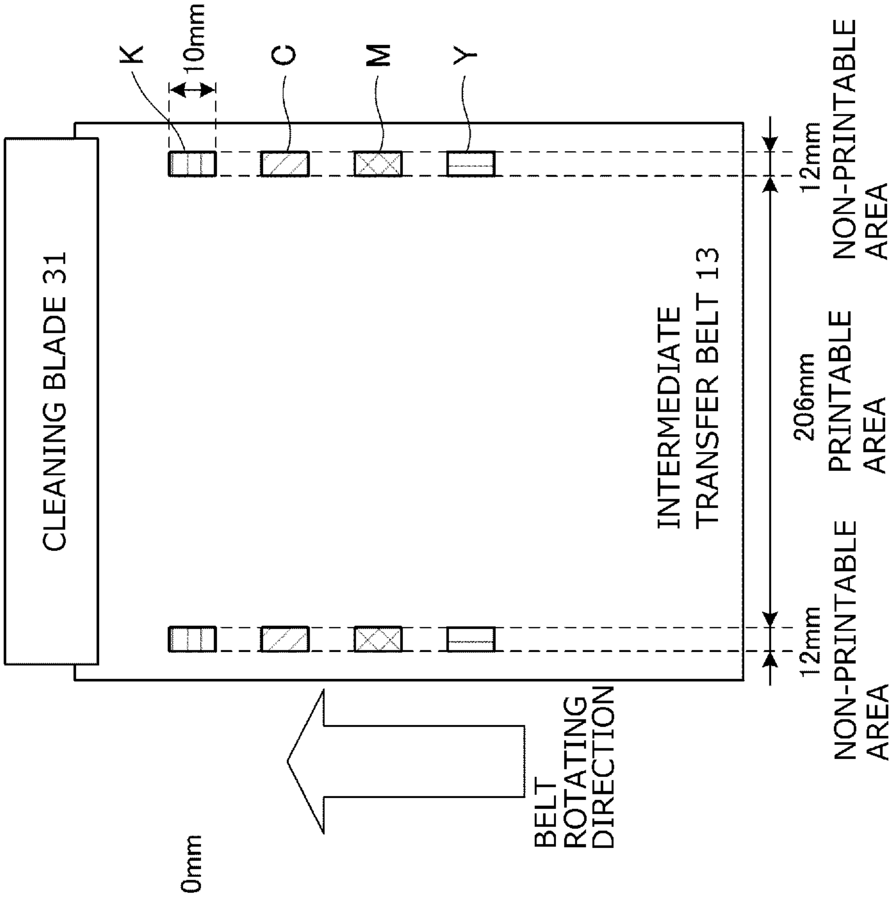
FIG. 3A and FIG. 3B are diagrams of a toner transfer state at toner supply
Figure 3A:
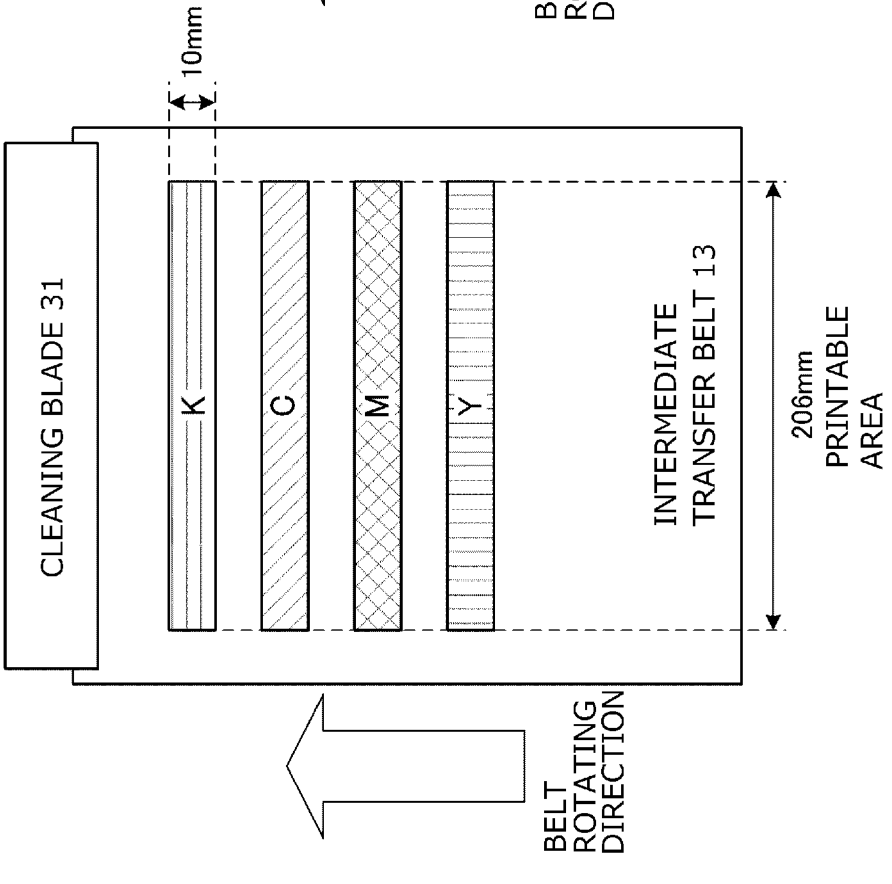

FIG. 3A and FIG. 3B illustrate the toner image on the intermediate transfer belt 13 when it is transferred and is collected by the cleaning blade 31. FIG. 3A is an example of the toner supply in the printable area, and FIG. 3B is an example of the toner supply outside the printable area.

Note that the amount was the same for the four colors in this example, but the amount to be used may be changed for each color depending on the toner consumption amount. That is, it is preferable that the toner supply amount of the color with a small toner consumption amount is increased so that the toner consumption amount of each color is made uniform. For example, if the yellow toner consumption amount is large, while the consumption amounts of the other three colors are similar, the toner image with a width of 13.3 mm in each color is formed so that the three colors excluding yellow have the same supply amount. Moreover, in FIG. 3A and FIG. 3B, a supply order to the cleaning blade 31 is black, cyan, magenta, and yellow. This is because the irradiation processing by the exposure unit 11 was performed at the same time to the photosensitive drums in the four colors in the configuration of this embodiment. However, even if the order of the four toner colors is switched, it does not affect the prevention of the turn-over of the cleaning blade 31.

Processing Flow

Figure 4:
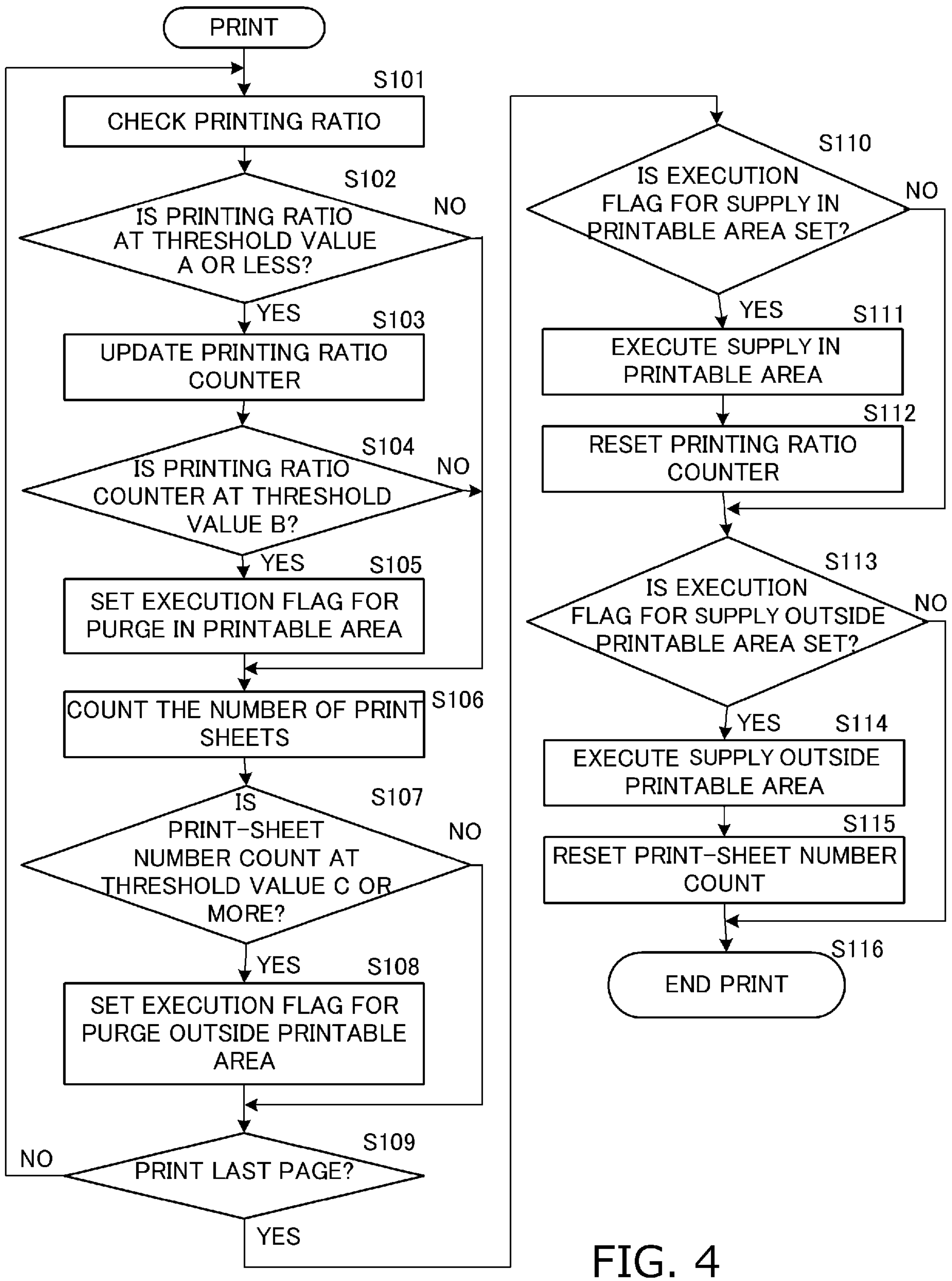
FIG. 4 is a flowchart of Embodiment 1.

The control at execution of the aforementioned two types of the toner supply mode will be described by using the flowchart in FIG. 4. First, determination of the toner supply in the printable area is made at Steps S101 to S105. First, when print processing is to be started at Step S101, a printing ratio of the printing image is checked.

Here, the printing ratio of the print image in this embodiment will be described. Since the transfer residual amount is to be calculated as a toner amount to be collected by the cleaning blade 31, the printing ratio is calculated by multiplying a printing area and an average printing amount on the basis of a case in which a single-color solid image is to be printed on a sheet size for which a user can specify the largest area in a width direction of the intermediate transfer belt 13 and capable of wide printing as 100%. In this embodiment, the largest sheet size in the width direction of the intermediate transfer belt 13 that can be specified by the user is the letter size (width: 216 mm, length: 280 mm). The largest range that can be specified by the user is, since margins are provided by 5 mm each on right and left and up and down of the sheet, a sheet width is 206 mm and a sheet length is 270 mm. Thus, the case where the single-color solid image is printed in this range is assumed to be the printing ratio of 100%.

Thus, if the sheet size is different or the like, the printing ratio is calculated by combining the sheet size and the printing pattern. A specific calculation method of the printing ratio will be described. First, regarding calculation of the toner amount to be transferred to the transfer material P, that is, calculation of the toner amount in one page, a calculation method and its physical meaning will be described. Note that the calculation of the toner amount in one page is performed by an image-data count portion 223 at a printing operation.

Figure 5:
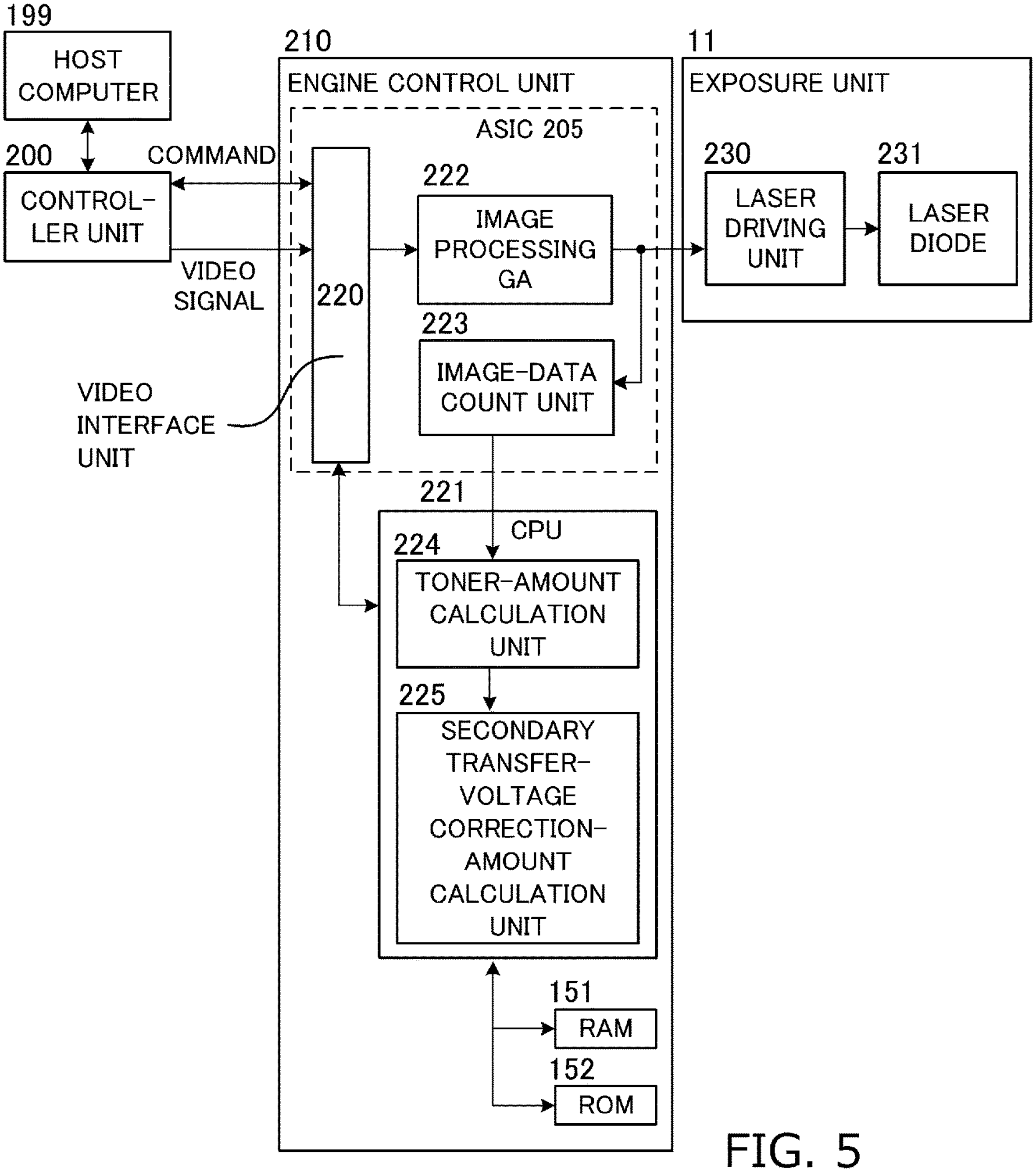
FIG. 5 is a functional block diagram of an engine control portion of Embodiment 1.

FIG. 5 is a diagram illustrating configuration and functional blocks of the engine control portion of the image forming apparatus 100. A host computer 199 is an information processor connected to the image forming apparatus 100. The user transmits print data by using the host computer 199.

The controller portion 200 is capable of mutual communication with the host computer 199 and the engine control portion 210. When the controller portion 200 receives the print data input from the host computer 199, it expands the print data and converts it to the image data for forming an image. Then, on the basis of the image data, a video signal for exposure in four colors for exposure is generated. When the generation of the video signal is completed, the controller portion 200 instructs start of the image formation to a video interface portion 220 of the engine control portion 210.

The engine control portion 210 has an ASIC 205, a CPU 221, a RAM 151, and a ROM 152. The ASIC 205 has the video interface portion 220, an image processing GA (gate array) 222, and an image-data count portion 223. The CPU 221 can operate as a toner-amount calculation portion 224 and a secondary transfer-voltage correction-amount calculation portion 225 as functional blocks by operating in accordance with a program.

The CPU 221 which received the image-formation start instruction from the video interface portion 220 starts various actuators and starts preparation for the image formation. When the image formation is ready, the CPU 221 notifies completion of the image formation preparation to the controller 200 via the video interface potion 220. When the completion of the image formation preparation is received, the controller 200 transmits a video signal to the video interface portion 220.

The video interface portion 220 transmits the received video signal to the image processing GA 222. The image processing GA222 converts the video signal received from the video interface portion 220 to a laser drive signal and transmits it to a laser driving portion 230 of the exposure unit 11. The exposure unit 11 is a scanner unit including the laser driving portion 230 and a laser diode 231.

Moreover, the image-data count portion 223 samples the laser drive signals and counts the number of times when the signal is High (light emission) (hereinafter, noted as "H"). On the other hand, the image-data count portion 223 does not perform counting if the signal is Low (lighted off) (hereinafter, noted to as "L") during the sampling of the laser drive signals.

The CPU 221 counts ny, nm, nc, and nk, which are the number of times when the laser drive signal becomes "H" for one page for the four colors of Y, M, C, and Bk, respectively, from the image-data count portion 223. Subsequently, a pixel count value n (=ny+nm+nc+nk) corresponding to a total number of the sums of the count value of each color is calculated. Assuming that the total sampling number for one color in one page is N, the toner amount X [%] in one page is calculated as in the formula (1) in the toner-amount calculation portion 224 of the CPU 211:

[Math. 1]

$$\text{Toner amount in one page } X[\%] = \frac{(\text{Pixel count value } n)}{(\text{Total sampling number } N \text{ for one color})} \times 100 \tag{1}$$

Regarding the total sampling number N for one color, since the laser driving is performed at individual timings for each color, sampling is performed at individual timings. The sampling cycle in this embodiment was set to a short cycle (100 MHz) so that all the pixel numbers can be counted. Therefore, the total sampling numbers Ny, Nm, Nc, and Nk for each of the four colors Y, M, C, and Bk were Ny=Nm=Nc=Nk=N. In this embodiment, the maximum value of the pixel count values ny, nm, nc, and nk of each color is the total sampling number N for one color and thus, a value of each color can be from 0 to 100 [%]. Therefore, X can be a value from 0 to 400 [%].

In this embodiment, as the printing ratio, a value to which predetermined conversion was applied is used for the aforementioned toner amount X [%] in one page. That is, the toner amount X is converted by supposing that the sheet size is the one having the maximum width for which the user can specify as a printable range. This is because, even if the toner amount X in one page is the same, when the sheet size is different, the toner amount collected by the cleaning blade 31 is also different. Thus, an area ratio according to the print sheet size is corrected in the calculation.

Therefore, it is necessary to grasp the sheet size of the print image for an area for which the user can specify print of the sheet which is the largest in the width direction and can be specified by the user in the image forming apparatus. That is, the area ratio is calculated as in the formula (2):

[Math. 2]

$$\text{Area ratio} = \frac{\text{(Area of region for which print can be specified in print size sheet)}}{\text{(area of user printable region of sheet for which user can specify the largest region in the width direction by the image forming apparatus)}} \quad (2)$$

At this time, the printing ratio Y [%] is defined by a formula 3. By means of this definition, the printing ratio can be calculated as the "supplied toner amount to the cleaning blade 31" including also the sheet size of the print pattern. Regarding a denominator in the formula (2) in this embodiment, the largest sheet size of the image forming apparatus is the letter size (216 mm×280 mm) and its printable region is 206 mm×270 mm, since the margin of 5 mm is provided on right and left and up and down.

[Math. 3]

$$\text{Printing ratio } Y\text{=Toner amount } X[\%] \text{ in one page} \times \text{Area ratio} \quad (3)$$

Returning to the flowchart, the description will be continued. The engine control portion 210 obtains the printing ratio defined as above at Step S101 and then, determines whether or not the printing ratio is a threshold value A (first threshold value) or less at Step S102. This is because, since the sufficient toner is supplied as the residual toner in the printable area when the printing ratio is sufficiently high, there is no need to perform the toner supply by the toner supply as addition. Thus, not by updating the counter, which will be described later, in the case of the printing ratio larger than the threshold value A, unnecessary toner supply is prevented, and occurrence of defective cleaning by excessive toner supply is suppressed. The threshold value A of the printing ratio in this embodiment is 20%.

The reason why the threshold value A is set to the printing ratio of 20% in this embodiment will be described. In view of maintenance of lubricating performance of the cleaning blade 31, the toner amount is preferably supplied by 0.02 mg/mm or more on an average to the cleaning blade 31. Since the width of the cleaning blade 31 is 240 mm in this embodiment, the residual toner supply amount is preferably 4.8 mg or more. In this embodiment, the transfer performance is transfer of 94% of the toner to the transfer material P, and assuming that the toner consumption amount is 0.4 g when the printing ratio is 100%, the residual toner amount supplied to the cleaning blade 31 becomes 4.8 mg when the printing ratio is 20%. Thus, in this embodiment, when the residual toner supply amount is 4.8 mg or less, the toner amount runs short and the lubricating performance becomes insufficient and thus, the threshold value A is set to the printing ratio of 20%. In this embodiment, the threshold value A is set to the printing ratio of 20%, but the printing ratio for determining the threshold value A may be set as appropriate in accordance with the configuration.

At Step S103, the engine control portion 210 updates a printing ratio counter when the printing ratio is at the threshold value A or less. Note that various counters and execution flags in the flow may be held in a form of a variable or a table stored on the memory. The engine control portion 210 adds a change amount according to the threshold value A to the printing ratio counter as shown in Table 1. The printing-ratio counter change amount is different depending on the printing ratio, because the toner amount recovered by the cleaning blade 31 is different depending on the printing ratio, and the timing requiring the toner supply is different.

TABLE 1

| Printing ratio | Printing-ratio counter change amount |
|---|---|
| Larger than threshold value A | 0 |
| Not larger than threshold value A | 1-0.05x (added portion) |

The engine control portion 210 determines whether or not the printing ratio counter exceeds a threshold value B (second threshold value) at Step S104. If it exceeds the threshold value B, the execution flag for the toner supply in the printable area is set at Step S105. Here, the threshold value B of the printing ratio counter value is set to 1000. In this case, if the printing ratio is 0%, for example, the change amount (increasing counter value) is "1−0.05×0=1" and thus, the value of the printing ratio counter value becomes 1000 when 1000 prints have elapsed, and the toner supply execution flag is set. Moreover, if the printing ratio is 10%, the change amount is "1−0.05×10=0.5" and thus, the printing ratio counter value becomes 1000 when 2000 prints have elapsed, and the toner supply execution flag is set.

Note that the printing ratio counter is increased when the printing ratio is at the threshold value A or less in the above description, but to the contrary, the counter may be decreased. In that case, the engine control portion 210 sets the execution flag for the toner supply in the printable area when the printing ratio counter value falls below the threshold value B.

The aforementioned processing from Step S101 to Step S105 is determination of the toner supply in the printable area, and the processing from the subsequent Step S106 to Step S108 is determination of the toner supply outside the printable area. The engine control portion 210 counts the number of print pages at Step S106. Then, at Step S107, it is determined whether a count of the number of print pages is a threshold value C (fourth threshold value) or more. If it is the threshold value C or more, the execution flag for the toner supply outside the printable area is set at Step S108.

This determination at Step S107 will be described. First, the toner is not supplied to outside the printable area regardless of the printing ratio. Thus, the toner supply outside the printable area is preferably executed at a certain interval regardless of the printing ratio or the print image pattern. Thus, in this embodiment, the number of print sheets is counted, and when it exceeds the threshold value C, the execution flag for the toner supply outside the printable area is set. In this embodiment, the threshold value C of the number of print sheets is set to 300.

The engine control portion 210 determines, at Step S109, whether it is the print last page or not and repeats the processing to Step S108 until the print is finished. When the print is finished, execution determination is made for each toner supply. That is, if the execution flag for the toner supply in the printable area was set at Step S110, the toner supply in the printable area is executed a Step S111, and the printing ratio counter is reset at Step S112. Similarly, if the execution flag for the toner supply outside the printable area was set at Step S113, the toner supply outside the printable area is executed at Step S114, and the print sheet count is reset at Step S115. After the determination described above is finished, the print is finished at Step S116.

Here, if the execution flag for the toner supply in the printable area was set and also the execution flag for the toner supply outside the printable area was set, the toner supply in the printable area and the toner supply outside the printable area may be executed at the same time.

Execution frequencies of the toner supply in the printable area and the toner supply outside the printable area will be described. In this embodiment, it is assumed that the threshold value C of the number of print sheets is 300, and the threshold value B of the counter value is 1000. Thus, the toner supply outside the printable area is executed once in 300 sheets, while the toner supply in the printable area is executed only once at least in 1000 sheets or more. That is, the execution frequency of the toner supply outside the printable area is larger than the execution frequency of the toner supply in the printable area. More preferably, the execution frequency of the toner supply outside the printable area is set to 3 times or more of the execution frequency of the toner supply in the printable area. The reason is that there is usually no toner supply outside the printable area, while the residual toner is supplied in the printable area by performing usual printing, and the frictional force is lowered.

Variation

In the aforementioned description, prevention of the turn-over when the cleaning blade 31 cleans the intermediate transfer belt 13, which is the intermediate transfer member, is described. However, the control in the toner supply operation of the present invention can be applied also to a case where the toner is collected from the photosensitive drum 1 as an image bearing member by using the blade. That is, when the cleaning unit 3 is brought into contact with the photosensitive drum 1 so as to collect the residual toner as shown in FIG. 1, the turn-over of the cleaning unit 3 can be suppressed by supplying the toner to a contact portion of the both in accordance with the control of the present invention. In other words, the present invention exerts an effect of suppressing the turn-over of the blade-shaped member when the toner image is formed on a rotatable rotary member (such as the intermediate transfer belt or the photosensitive drum). As a result, an adverse effect on the image can be suppressed.

Moreover, in this embodiment, regarding the toner supply in the printable area, the printing ratio counter is controlled by the printing-ratio counter change amount as in Table 1, but this is not limiting. That is, it is only necessary that the toner supply of the lubricant is performed so that the frictional force between the intermediate transfer belt 13 and the cleaning blade 31 does not become a certain level or more. If a frictional coefficient μ itself of the intermediate transfer belt 13 is low, for example, the execution frequency may be lowered by raising the threshold value of the printing ratio. Alternatively, regarding the calculation formula of the printing-ratio counter change amount according to the printing ratio, if the frictional coefficient μ of the intermediate transfer belt 13 is low, inclination of the printing ratio counter change amount may be made gentler, and the execution frequency may be lowered. Moreover, if the printing ratio is the threshold value A or more, such a method may be used that the printing ratio counter is decreased, and the toner supply is performed when the value of the printing ratio counter falls below the threshold value B.

Moreover, in this embodiment, the number of print sheets is used as an execution condition of the toner supply outside the printable area, but the purpose is to prevent exhaustion of the lubricant by the toner between the intermediate transfer belt 13 and the cleaning blade 31 by supplying the toner at a certain interval. Therefore, the execution condition is not limited to the number of prints. That is, a value related to driving of the image forming apparatus or a value indicating a length of driving time since the image forming apparatus began to be used, for example, can be used as the threshold value C (fourth threshold value). For example, the driving time (rotating time) of the intermediate transfer belt 13 is calculated, and the toner supply outside the printable area may be performed at each certain driving time. Alternatively, when the present invention is applied to cleaning of the photosensitive drum by the cleaning blade, the rotating time of the photosensitive drum maybe used as the threshold value. As described above, it is preferable that the toner supply outside the printable area is executed at a certain interval. In this embodiment, average driving time per print sheet is approximately 10 seconds and thus, such a control may be executed that the toner supply outside the printable area is executed once in 3000 seconds of the driving time, for example.

Figure 6:
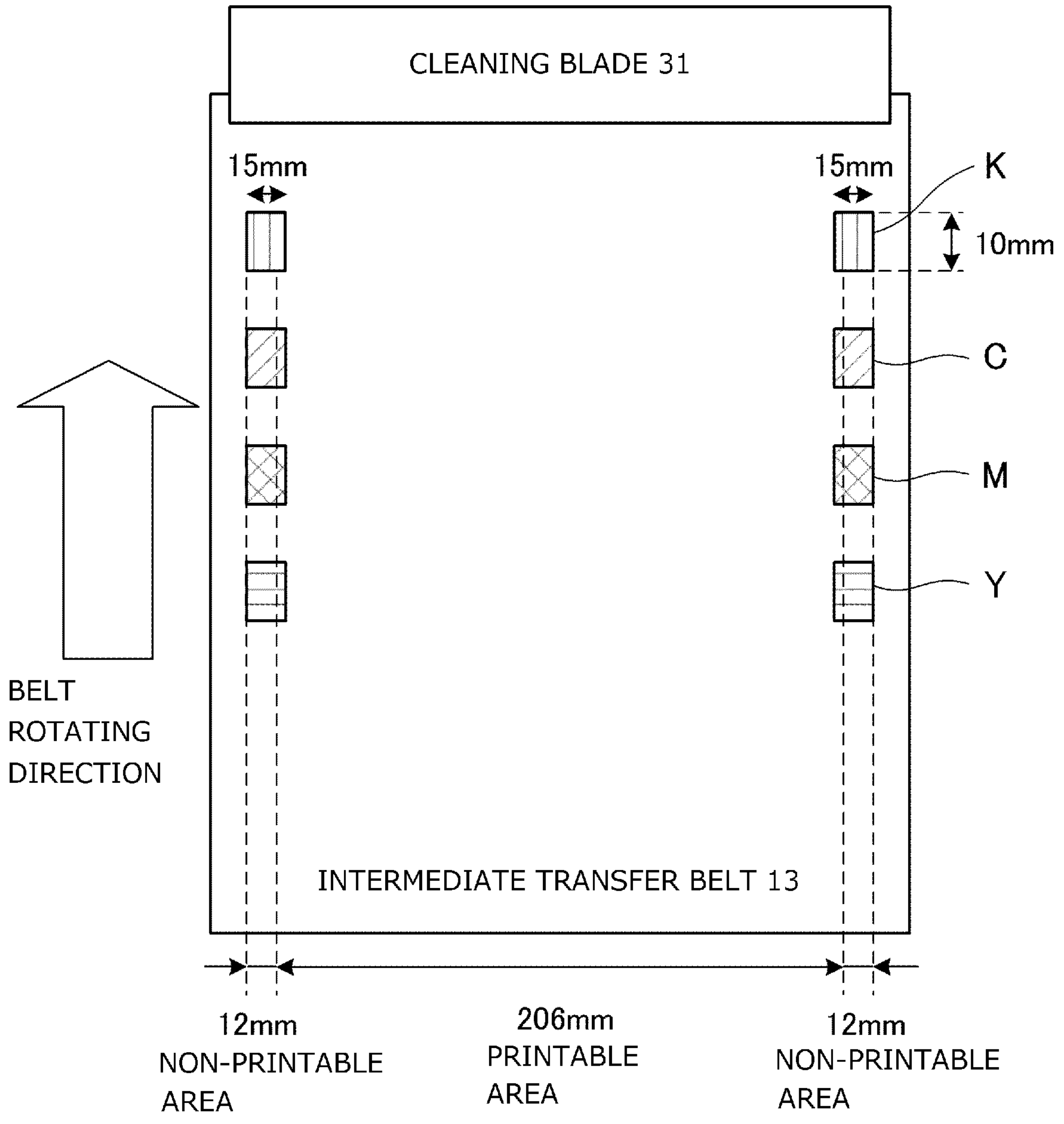
FIG. 6 is a diagram of the toner transfer state of the toner supply outside a printable area of Embodiment 1.

Moreover, in this embodiment, the toner is supplied to the entire space outside the printable area in the case of the toner supply outside the printable area. However, there is a possibility that the irradiated region can be shifted from the center due to displacement caused by staggering of the intermediate transfer belt 13 or forced light emission of the laser irradiation and thus, a lateral width of the toner supply outside the printable area is preferably made wider than the current setting. Moreover, in order to effectively execute the toner supply outside the printable area, it is preferably longer in the rotating direction. On the other hand, it is not preferable that the defective cleaning is caused by excessive supply of the toner. Thus, as in FIG. 6, for example, it is also preferable that a width of 15 mm is provided, respectively, on both end portions of the developing opening region, that is, for 40 mm in total in the rotating direction.

Moreover, the toner consumption amount in the solid image can be varied depending on deterioration of durability of the developing apparatus in some cases. Furthermore, depending on the operation environments of the transfer material P and the image forming apparatus in use, the toner amount transferred from the intermediate transfer belt 13 to the transfer material P is varied. Thus, it is also preferable that the toner amount reaching the cleaning blade 31 is corrected and reflected in the printing-ratio counter change amount by considering these influences.

Under a high-temperature and high-humidity environment, for example, since the transfer performance deteriorates in general, the supply of the residual toner amount increases. Therefore, the execution frequency of the toner supply in the printable area is lowered by decreasing the printing-ratio counter change amount under the high-temperature and high-humidity environment. Moreover, when the toner consumption amount increases due to deterioration of durability, too, the transfer residual toner supply increases and thus, the printing-ratio counter change amount is preferably reduced. As described above, a printing-ratio counter change amount can be changed in accordance with the environment or a history of durability.

By having the different toner supply modes for outside the printable area and for inside the printable area and by setting the execution conditions based on the different threshold values for each of them, the optimal toner supply can be performed to the entire cleaning blade regardless of the print pattern. As a result, the turn-over of the cleaning blade can be prevented, and the adverse effect on the image caused by that can be suppressed.

Embodiment 2

Subsequently, Embodiment 2 will be described mainly on points different from Embodiment 1. For the configuration and processing similar to those in Embodiment 1, the description will be simplified.

Here, at the beginning of use of the apparatus, since the toner is not supplied to the cleaning blade 31, the possibility of occurrence of the turn-over of the blade outside the printable area is high. And when the toner supply to the cleaning blade 31 is started, the toner is interposed between the intermediate transfer belt 13 and the cleaning blade 31, and the frictional force lowers. Moreover, if toner is held for a long time before the cleaning blade 31, the toner forms a protective layer preventing the defective cleaning, and a contact state of the cleaning blade is made stable. Since the frictional force lowers and the contact state of the blade is made stable, the possibility of occurrence of the blade turn-over lowers. Thus, when the number of print sheets increases, the execution frequency of the toner supply outside the printable area can be reduced.

In this embodiment, in order to reduce the execution frequency of the toner supply outside the printable area, two types of toner supply modes, that is, full-surface toner supply combining the areas of the toner supply in the printable area and the toner supply outside the printable area as well as the toner supply outside the printable area are used. By controlling the two types of toner supply modes, the execution frequency of the toner supply outside the printable area can be reduced, and as a result, the toner consumption can be reduced in a long term. That is, in this embodiment, the full-surface toner supply is a first supply operation, while the toner supply outside the printable area is a second supply operation, and the engine control portion determines whether each toner supply is executable or not in accordance with the flow.

Figure 7:
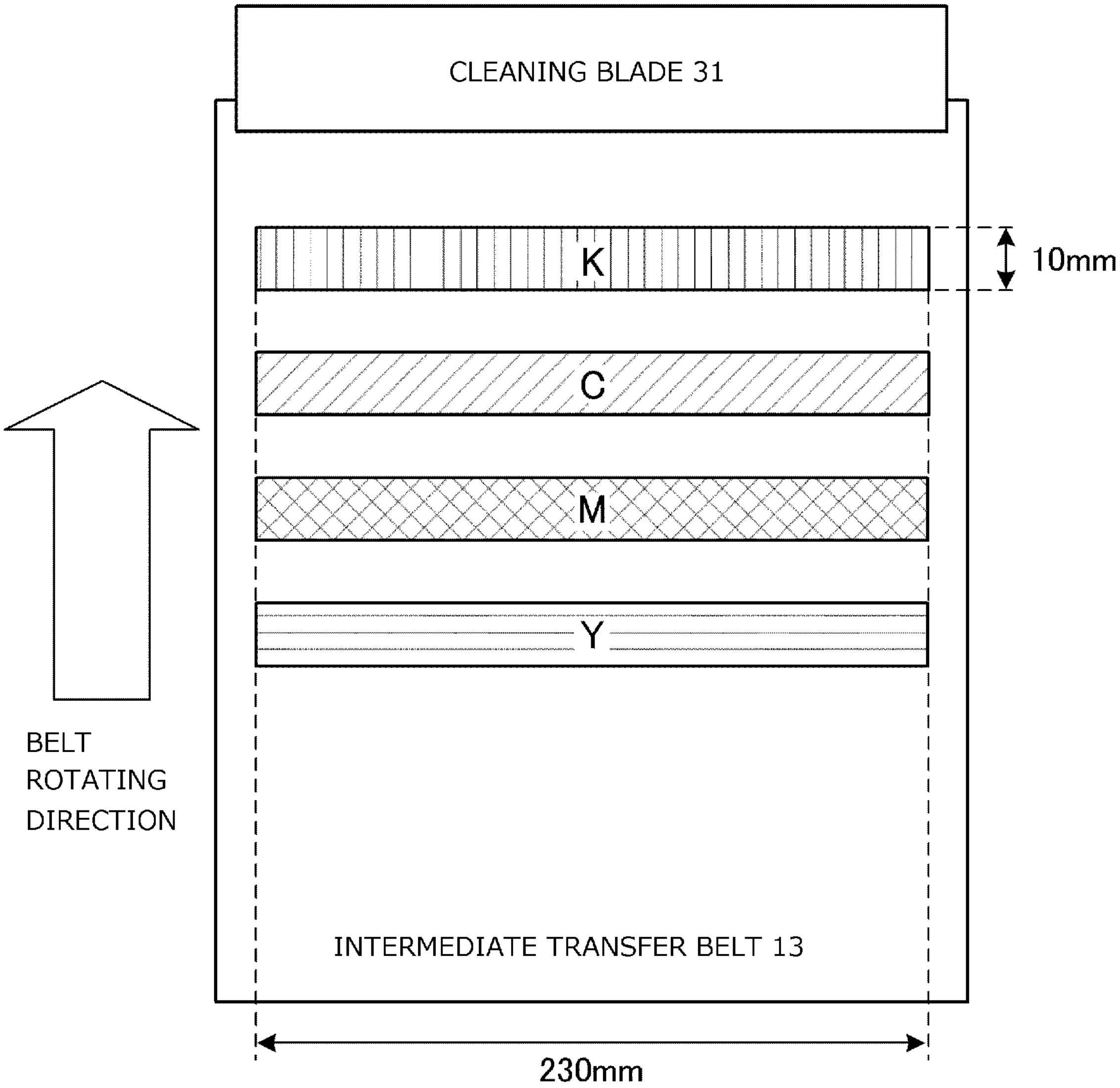
FIG. 7 is a diagram of the toner transfer state at the toner supply in Embodiment 2.

By using FIG. 7, the toner image transferred in the full-surface toner supply used in this embodiment will be described. The supplied toner amount is, similarly to Embodiment 1, 10 mm in each color, totaling in 40 mm, in the length in the rotating direction (conveyance direction) of the intermediate transfer belt 13. Moreover, a width in a direction (width direction) orthogonal to the rotating direction of the intermediate transfer belt 13 is 230 mm, which is over the entire developing opening width. By printing the solid patch in each color on this area, a transfer image as in FIG. 7 is supplied to the cleaning blade 31. As described in Embodiment 1, the toner supply order of each color may be changed or the toner to be used may be changed in accordance with the toner consumption amount.

Figure 8:
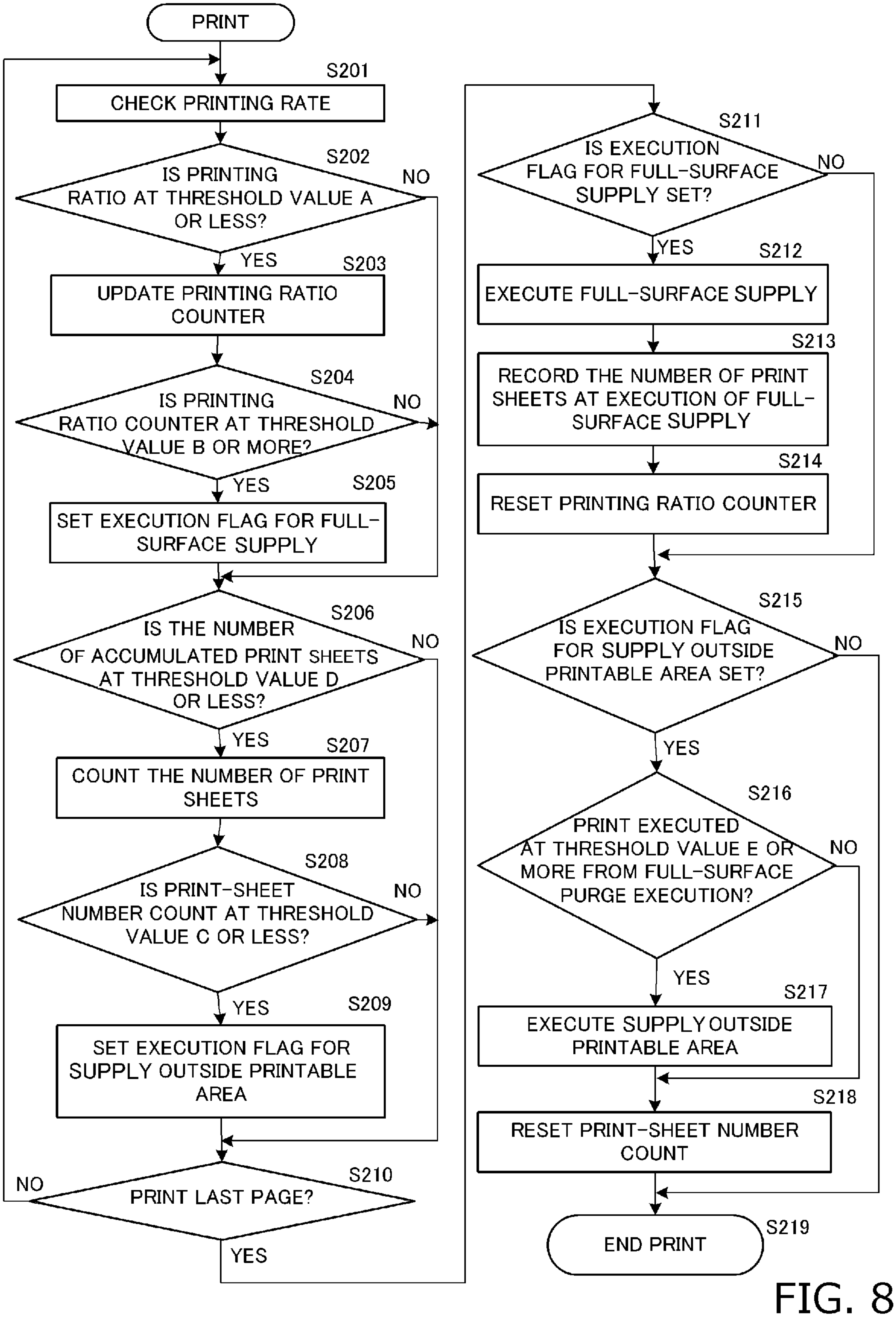
FIG. 8 is a flowchart of Embodiment 2.

The toner supply execution control in this embodiment will be described by using the flowchart in FIG. 8. Processing from Step S201 to Step S205 is execution determination processing of the full-surface toner supply. At Step S201, the engine control portion 210 checks the printing ratio. Subsequently, at Step S202, it is determined whether the printing ratio is the threshold value A or less. If the printing ratio is the threshold value A or less, the printing ratio counter is updated at Step S203. Subsequently, at Step S204, it is determined whether the printing ratio counter is at the threshold value B or more. And if the printing ratio counter is at the threshold value B or more, the execution flag for the full-surface toner supply is set at Step S205.

Subsequently, execution determination of the toner supply outside the printable area is executed at Steps S206 to S209. First, at Step S206, the engine control portion 210 determines whether the number of accumulated print sheets is the threshold value D (fifth threshold value) or less. This is because, as described above, if the number of print sheets is large, the toner is present before the cleaning blade in a long term and forms the cleaning protective layer, whereby the possibility of occurrence of the cleaning blade turn-over is reduced. Thus, in this embodiment, if the number of accumulated print sheets since the start of use of the apparatus is large, the toner supply outside the printable area is not executed unnecessarily. In the case of the threshold value D or less, at Step S207, the number of print sheets in the image forming operation this time is counted, and it is determined at Step S208 whether the print-sheet number count is the threshold value C or more. If it is the threshold value C or more, the execution flag for the toner supply outside the printable area is set at Step S209. As a result, if the number of accumulated print sheets is larger than the threshold value D, it is determined that the possibility of occurrence of the turn-over is low, and the toner supply for printable area is not executed. In this embodiment, the threshold value D is set to the number of accumulated print sheets of 3000 sheets.

The execution determination on the basis of the execution threshold value related to the printing ratio and the number of print sheets at each step above is organized as in the following Table 2:

TABLE 2

| Number of accumulated print sheets | Printing ratio | Full-surface purge | Purge outside printable area |
|---|---|---|---|
| Threshold value D or less | Threshold value A or less | Executed when printing ratio counter is at threshold value B or more | Executed when print-sheet number counter is at threshold value C or more |
| Threshold value D or less | Larger than threshold value A | No execution | Executed when print-sheet number counter is at threshold value C or more |
| Larger than threshold value D | Threshold value A or less | Executed when printing ratio counter is at threshold value B or more | No execution |
| Larger than threshold value D | Larger than threshold value A | No execution | No execution |

The engine control portion 210 repeats the aforementioned processing of Steps S201 to S209 until the print last page. That is, the engine control portion 210 determines at Step S210 whether it is the print last page or not, and in the case of the last page, the execution of each toner supply is determined during the post-rotation operation after the printing.

The engine control portion 210 determines execution of the full-surface toner supply from Steps S211 to S214. First, at Step S211, it is determined whether the execution flag for full-surface toner supply is set. If the execution flag is set, at Step S212, the full-surface toner supply is executed. Subsequently, at Step S213, the number of print sheets at execution of the full-surface toner supply is recorded, and at Step S214, the printing ratio counter is reset. Since the record of the number of the print sheets at Step S213 will be used at Step S216 later for the determination at a threshold value E, it will be described later in detail.

Subsequently, the engine control portion 210 executes execution determination of the toner supply outside the printable area from Steps S215 to S218. At Step S215, it is determined whether the execution flag for the toner supply outside the printable area is set. If the execution flag is set, it is determined at Step S216 whether the print was executed at the threshold value E or more from the full-surface toner supply execution. That is, it is determined whether the number of print sheets has increased from the number of print sheets at the full-surface toner supply to the threshold value E or more. A purpose of this determination at Step S216 will be described. Since the region of the full-surface toner supply also includes the region for toner supply outside the printable area, if the execution timing of the toner supply outside the printable area and that of the full-surface toner supply are too close, the effect of lowering of the frictional force decreases. Thus, by the determination at this Step, it is ensured that the toner supply outside the printable area is executed at timing sufficiently away from the execution timing of the full surface toner supply so as to prevent unnecessary toner supply. In this embodiment, the number of print sheets of 100 sheets is set to the threshold value E. If the printing has been performed at the threshold value E or more, the toner supply outside the printable area is executed at Step S217. At Step S218, regardless of whether it is the threshold value E or more, the print-sheet number counter is reset. Then, the print is finished at Step S219.

As described above, according to this embodiment, the full-surface toner supply and the toner supply outside the printable area can be controlled in combination. As a result, when the toner supply to the entire cleaning blade is needed, the full-surface toner supply mode in which the toner is supplied to the entirety including the inside and outside of the printable area is executed, while in the other cases, the toner supply outside the printable area is executed. As a result, the turn-over of the blade can be prevented while the unnecessary toner supply is suppressed.

Note that, in this embodiment, the number of accumulated print sheets of 3000 sheets was set as the threshold value D, but as described also in the variation of Embodiment 1, the execution condition of the toner supply outside the printable area by the threshold value C is not limited to the number of print sheets. In that case, the threshold value D may be set so that the execution number of times of the toner supply outside the printable area by the threshold value C is kept to a certain number of times. For example, when the drive time of the intermediate transfer belt 13 as described in the variation above is to be calculated, it may be such control that, by setting the drive time of 3000 seconds as the threshold value C, the threshold value D is set to 30000 seconds during which the threshold value C is executed 10 times.

Embodiment 3

Subsequently, Embodiment 3 will be described mainly on points different from each of the aforementioned embodiments. For the configuration and processing similar to those in each of the aforementioned embodiments, the description will be simplified.

In Embodiment 3, efficient toner supply is executed by using three types of toner supply modes. Specifically, the three types are a toner supply mode in the printable area, a toner supply mode outside the printable area, and a full-surface toner supply mode. That is, in Embodiment 3, in addition to the toner supply in the printable area (first supply operation) and the toner supply outside the printable area (second supply operation) related to the supply operation of the toner 5, the full-surface toner supply (third supply operation) can be executed.

Figure 9:
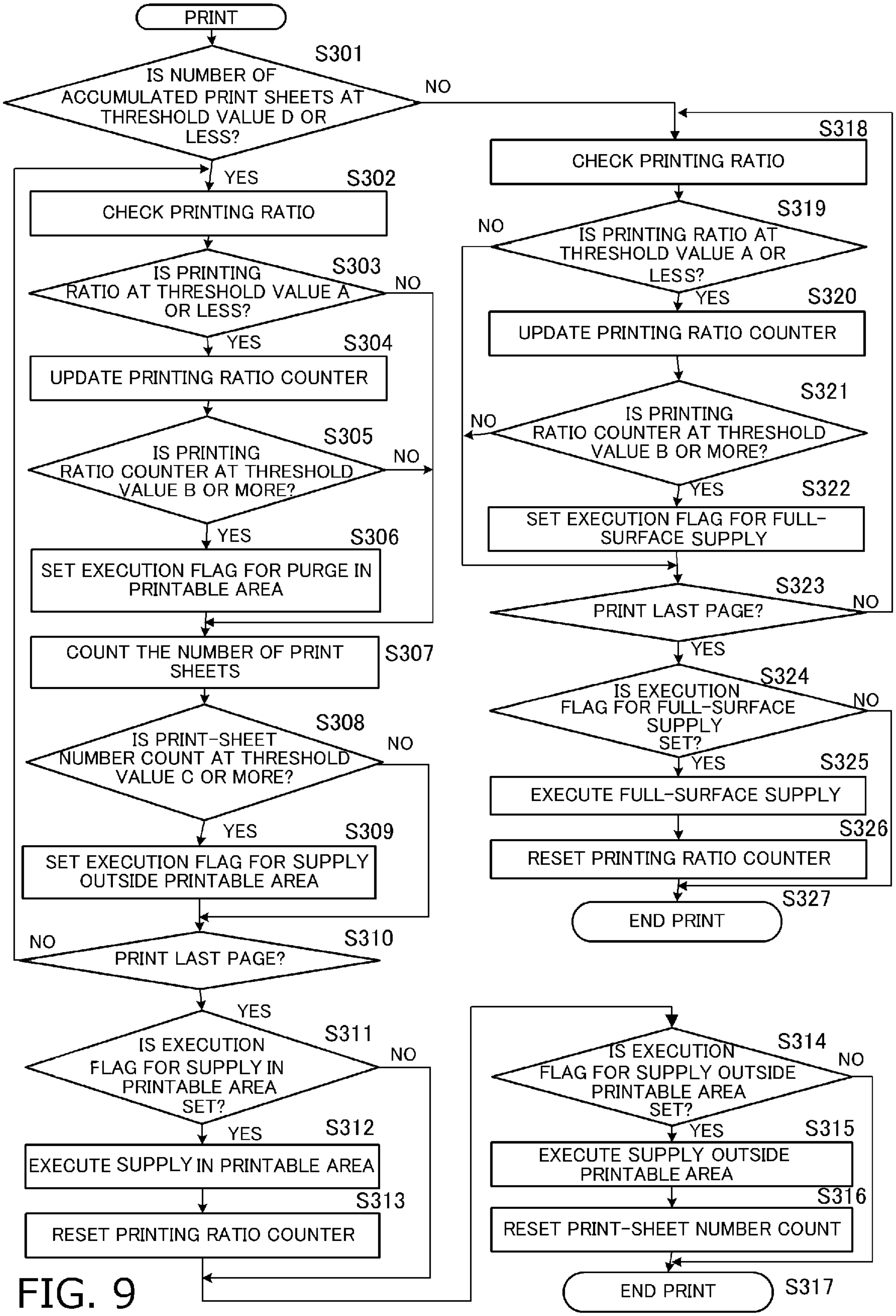
FIG. 9 is a flowchart of Embodiment 3.

FIG. 9 is a flowchart illustrating processing of this embodiment. The engine control portion 210 first determines at Step S301 whether the number of accumulated print sheets is the threshold value D or less. This is for executing control based on the number of accumulated print sheets from the beginning of the use similarly to Embodiment 2. That is because the turn-over can easily occur at the beginning of the use, while, if the toner is held for a long time before the cleaning blade 31, the protective layer by the toner is formed, and the possibility of occurrence of the turn-over lowers. Therefore, when having been used for a certain period or more, the execution pattern of the toner supply mode is changed to an optimal one. Note that the beginning of use here refers to the timing when the image formation is started from a state where the toner is not held in the cleaning blade 31 such as start of service of the image forming apparatus or at start of use after maintenance.

In the case of the threshold value D or less at Step S301, the engine control portion 210 proceeds to Step S302 and after and executes the two types of the toner supply modes, that is, the toner supply in the printable area and the toner supply outside the printable area. First, from Steps S302 to S306, the execution flag for the toner supply in the printable area is determined. First, at Step S302, the printing ratio is determined. At Step S303, it is determined whether the printing ratio is the threshold value A or less, and in the case of the threshold value A or less, the processing proceeds to Step S304 and updates the printing ratio counter. If it is larger than the threshold value A, the processing proceeds to Step S307. The engine control portion 210 determines at Step S305 whether the printing ratio counter is at the threshold value B or more. In the case of the threshold value B or more, the execution flag for the toner supply in the printable area is set at Step S306. If it is smaller than the threshold value B, the processing proceeds to Step S307.

Subsequently, the engine control portion 210 sets the execution flag for toner supply outside the printable area from Steps S307 to S309. First, the print-sheet number counter is updated at Step S307. Subsequently, at Step S308, it is determined whether the print-sheet number counter is at the threshold value C or more. In the case of the threshold value C or more, the execution flag for toner supply outside the printable area is set at Step S309. If it is smaller than the threshold value C, the processing proceeds to Step S310.

The engine control portion 210 determines at Step S310 whether it is the print last page or not. If it is not the last page, the aforementioned processing is repeated until the print end. If it is the last page, it proceeds to the post-rotation operation after the print end, and at Step S311 and after, each toner supply processing during the post-rotation operation is executed.

The engine control portion 210 determines at Step S311 whether the execution flag for toner supply in the printable area is set or not. If the execution flag is set, the toner supply in the printable area is executed at Step S312, and the printing ratio counter is reset at Step S313. Subsequently, the engine control portion 210 determines at Step S314 whether the execution flag for toner supply outside the printable area is set or not. If the execution flag is set, the toner supply outside the printable area is executed at Step S315, and the print-sheet number counter is reset at Step S316. Then, the print is finished at Step S317.

On the other hand, if it is larger than the threshold value D at Step S301, the engine control portion 210 proceeds to Step S318, where the toner supply mode of the full-surface toner supply is executed. First, the printing ratio is checked at Step S318, and it is determined at Step S319 whether the printing ratio is the threshold value A or less. In the case of the threshold value A or less, the printing ratio counter is updated at Step S320. If it is larger than the threshold value A, the processing proceeds to Step S323. Subsequently, at Step S321, it is determined whether the printing ratio counter is at the threshold value B or more. In the case of the threshold value B or more, the execution flag for the full-surface toner supply is set at Step S322. If it is smaller than the threshold value B, the processing proceeds to Step S323.

The engine control portion 210 determines at Step S323 whether it is the print last page or not. If it is not the last page, the processing from Step S318 to Step S322 is repeated until the print end. If it is the last page, the full-surface toner supply is executed during the post-rotation operation after the print end. First, at step S324, it is determined whether the execution flag for full-surface toner supply is set, and if it is set, the full-surface toner supply is executed at Step S325. Then, at Step S326, the printing ratio counter is reset, and at Step S327, the print is finished.

In this embodiment, the threshold value A for determining the printing ratio is set to 20%, the threshold value B for determining the printing ratio counter is set to 1000, and the threshold value C for determining the print-sheet number counter is set to 300. The determinations in the flowchart in FIG. 9 is organized in Table 3:

TABLE 3

| Number of print sheets | Printing ratio | Purge in printable area | Purge outside printable area | Full-surface purge |
|---|---|---|---|---|
| Threshold value D or less | Threshold value A or less | Executed when printing ratio counter is at threshold value B or more | Executed when print-sheet number counter is at threshold value C or more | No execution |
| Threshold value D or less | Larger than threshold; value A | No execution | Executed when print-sheet number counter is at threshold value C or more | No execution |
| Larger than threshold value D | Threshold value A or less | No execution | No execution | Executed when printing ratio counter is at threshold value B or more |
| Larger than threshold value D | Larger than threshold value A | No execution | No execution | No execution |

In this embodiment, by means of the threshold value determination based on the printing ratio and the number of print sheets, the three types of toner supply modes are executed/controlled. As a result, since the number of toner supply times can be further reduced by the toner supply outside the printable area than Embodiment 2, stable operation of the cleaning blade 31 can be realized while the toner is used more efficiently. Note that, as shown in Table 3, one of determination standards on whether the third supply operation is to be performed or not is determination of the number of print sheets by using the threshold value D. However, the threshold value D is not limited to that as long as it is the determination standard based on the number of driving times or the drive time of the image forming apparatus. For example, it may be determined that the third supply operation is performed when the rotation time of the intermediate transfer belt (or if the rotary member is the photosensitive drum, the photosensitive drum) is a certain period of time or longer.

Embodiment 4

Subsequently, Embodiment 4 will be described mainly on points different from each of the aforementioned embodiments. For the configuration and processing similar to those in each of the aforementioned embodiments, the description will be simplified. In this embodiment, when print with high printing ratio is added as a print pattern, by lowering the toner supply execution frequency as compared with the case of each of the aforementioned embodiments, the toner is used more efficiently.

Specifically, the engine control portion 210 changes the formula so as to execute subtraction processing by the printing ratio counter in the case of the print with a high print with a high printing ratio. The printing ratio counter in each of the aforementioned embodiments does not increase when the printing ratio is larger than the threshold value as shown in Table 1, for example. However, when the printing ratio increases, the waste toner amount also increases and thus, the waste toner amount collected by the cleaning blade 31 can be calculated more accurately by subtracting the printing-ratio counter change amount also when the printing ratio is high.

Thus, in this embodiment, as shown in Table 4, a threshold value F (third threshold value) larger than the threshold value A is set, and when the printing ratio is larger than the threshold value F, the printing-ratio counter change amount is subtracted from the value of the current printing ratio counter. In this embodiment, the threshold value A is the printing ratio at 20% and the threshold value F is the printing ratio at 30%. The threshold value B of the printing ratio counter executing the toner supply may be 1000 similarly to the aforementioned embodiment, for example.

TABLE 4

| Printing ratio | Printing-ratio counter change amount |
|---|---|
| Larger than threshold value F | 1-0.0334x (subtraction portion) |
| Larger than threshold value A and not larger than threshold value F | 0 |
| Threshold value A or less | 1-0.05x (addition portion) |

As described above, in this embodiment, when the printing ratio by the printing ratio counter is larger than the threshold value F, the subtraction is performed. As an example, such a print pattern is assumed that, after the print with a high printing ratio (100%, for example) continues, the print with the printing ratio at 0% is performed only one in ten sheets. In Embodiments 1 to 3, since the value of the printing ratio counter only increases, the toner supply according to the threshold value of the printing ratio counter is executed even for such a pattern, but in this embodiment, since the value of the printing ratio counter can decrease in some cases, the toner supply is not executed.

In Embodiment 1, if the printing ratio counter is decreased when the printing ratio is the threshold value A or less and if the toner supply in the printable area is executed when the value of the printing ratio counter falls below the threshold value B, if the printing ratio is larger than the threshold value F, control is executed such that the printing ratio counter is increased.

If the subtraction of the printing ratio counter continues long, even if the print with a low printing ratio continues for a long time after that, there is a concern that the toner supply is not executed. Thus, if the print with a low print and a low printing ratio continues, such control is preferable that the toner supply is executed. This is because the toner supply is to be executed similarly to Embodiments 1 to 3, if the printing ratio is low, the toner supply is low.

Specifically, a threshold value G, which is a lower limit value of the printing ratio counter, is provided so that the turn-over does not occur even from a stable state where the cleaning blade 31 sufficiently receives the toner supply. The threshold value G can be set to −1000, for example. That is, even if the counter value becomes smaller than the threshold value G by the subtraction of the printing-ratio counter change amount, the engine control portion 210 has the threshold value G (−1000). As a result, even when the toner has been supplied sufficiently, and the printing ratio counter is negative, if a low-print pattern continues, the tonner supply of the toner supply is performed while the continuing printing with the low print has the number of print sheets twice of those of Embodiments 1 to 3.

In Embodiment 1, when it is configured such that the printing ratio counter is decreased in the case where the printing ratio is the threshold value A or less, and the toner supply in the printable area is performed when the value of the printing ratio counter falls below the threshold value B, it is preferable that an upper limit value is set for the threshold value G.

Moreover, when the printing ratio counter is controlled as in Table 4, without making the determination on whether the printing ratio is the threshold value A or less in each of the flowcharts of Embodiments 1 to 3, the printing ratio counter may be updated in any printing ratio case. In this case, at update of the printing ratio counter, processing including the subtraction of the printing-ratio counter change amount is executed as in the aforementioned Table 4, for example.

Moreover, even if the printing ratio counter is subtracted due to the high print and falls below the threshold value B after the printing ratio counter exceeds the threshold value B, and the execution flag is set, the toner supply execution flag is held in the set state. This is because, since a state where execution of the toner supply was needed occurred even once, the toner is to be supplied to the cleaning blade 31 so as to lower the frictional force for stable operation.

According to the aforementioned operation, when the print image with a high printing ratio comes in, the execution frequency of the toner supply according to the printing ratio counter is lowered and thus, control with more saved toner can be executed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-146458, filed Sep. 8, 2021, which is hereby incorporated by reference herein in its entirety.

What is claimed is:

1. An image forming apparatus comprising:

a rotatable rotary member, on a surface of which a developer image by a developer supplied from a development unit is formed;

a collection unit configured to collect the developer on the surface of the rotary member by using a blade-shaped contact member which is in contact with the surface of the rotary member; and a control unit configured to be able to perform control on (a) an image forming operation for forming the developer image on the surface of the rotary member, and (b) a supply operation for supplying the developer, supplied from the development unit to the surface of the rotary member, to a contact portion between the rotary member and the contact member, wherein the developer is not transferred to a transfer material but is collected by the collection unit, wherein the control unit performs, on the developer supplied on the rotary member, (1) a first supply operation, (2) a second supply operation, or (3) a transfer control for transferring the image, formed on the rotary member, to the transfer material, and wherein in a case where (i) the supply operation for supplying the developer to inside of a printable area, on which the developer image can be formed on the surface of the rotary member and which is in a direction orthogonal to a rotating direction of the rotary member, is defined as the first supply operation, (ii) the supply operation for supplying the developer to outside the printable area is defined as the second supply operation, and (iii) a ratio of an amount of the developer used to the printable area of the transfer material is defined as a printing ratio, the control unit executes (A) control such that the first supply operation and the second supply operation are performed at different timings, and (B) control such that the first supply operation is performed on the basis of information on the printing ratio, and the second supply operation is performed on the basis of information on the number of prints of the transfer material.

2. The image forming apparatus according to claim 1, further comprising:

an image bearing member, on a surface of which an electrostatic latent image is formed and a developer image by the developer, supplied from the development unit to the electrostatic latent image, is formed, wherein the rotary member is an intermediate transfer member, and the developer image formed on the surface of the intermediate transfer member is obtained by transfer of the developer image formed on the image bearing member.

3. The image forming apparatus according to claim 1, wherein the rotary member is an image bearing member on which a developer image by the developer, supplied from the development unit, is formed on an electrostatic latent image formed on a surface.

4. The image forming apparatus according to claim 1, wherein the printable area is a center area in a direction orthogonal to the rotating direction of the rotary member.

5. The image forming apparatus according to claim 1, wherein the contact member of the collection unit is in contact with the rotary member in the direction orthogonal to the rotating direction of the rotary member, wherein the printable area is an area corresponding to a width on which an image based on image information can be formed in the orthogonal direction, and wherein the control unit is configured to supply the developer to the contact member in contact with the rotary member inside the printable area in the first supply operation and supplies the developer to the contact member in contact with the rotary member outside the printable area in the second supply operation.

6. The image forming apparatus according to claim 1, wherein the control unit is configured to increase a value of a printing ratio counter when the printing ratio is a first threshold value or less and performs the first supply operation when the value of the printing ratio counter exceeds a second threshold value.

7. The image forming apparatus according to claim 6, wherein the control unit is configured to decrease the value of the printing ratio counter when the printing ratio is larger than a third threshold value, which is a value larger than the first threshold value.

8. The image forming apparatus according to claim 7, wherein the control unit is configured to set a lower limit value to a value of the printing ratio counter.

9. The image forming apparatus according to claim 1, wherein the control unit is configured to decrease a value of a printing ratio counter when the printing ratio is at a first threshold value or less and executes the first supply operation when the value of the printing ratio counter falls below a second threshold value.

10. The image forming apparatus according to claim 9, wherein the control unit is configured to increase the value of the printing ratio counter when the printing ratio is larger than a third threshold value, which is a value larger than the first threshold value.

11. The image forming apparatus according to claim 10, wherein the control unit is configured to set an upper limit value to a value of the printing ratio counter.

12. The image forming apparatus according to claim 1, wherein the control unit is configured to determine that the second supply operation is performed when a value related to driving of the image forming apparatus is a fourth threshold value or more.

13. The image forming apparatus according to claim 12, wherein the control unit is configured to use as the fourth threshold value the number of prints of the transfer material by which an image formed on the rotary member by the transfer control has been transferred to the transfer material.

14. The image forming apparatus according to claim 12, wherein the control unit is configured to use as the fourth threshold value a rotating time of the rotary member.

15. The image forming apparatus according to claim 12, wherein the control unit is configured to determine that the second supply operation is not performed when the value related to driving of the image forming apparatus is larger than a fifth threshold value.

16. The image forming apparatus according to claim 15, wherein the control unit is configured to use as the fifth threshold value the number of prints of the transfer material by which the image formed on the rotary member by the transfer control has been transferred to the transfer material.

17. The image forming apparatus according to claim 15, wherein the control unit is configured to use as the fifth threshold value a rotating time of the rotary member.

18. The image forming apparatus according to claim 1, wherein the control unit is configured to set an execution frequency of the second supply operation larger than an execution frequency of the first supply operation.

19. The image forming apparatus according to claim 18, wherein the control unit is configured to set an execution frequency of the second supply operation three times or more larger than the execution frequency of the first supply operation.

20. The image forming apparatus according to claim 1, wherein in the first supply operation, the developer is supplied to inside and outside of the printable area.

21. The image forming apparatus according to claim 1, wherein the control unit is configured to determine that the second supply operation is performed, when the number of prints of the transfer material, by which an image formed on the rotary member has been transferred to the transfer material by the transfer control, is a fourth threshold value or more.

22. The image forming apparatus according to claim 21, wherein the control unit is configured to use as the fourth threshold value the number of prints of the transfer material by which the image formed on the rotary member by the transfer control has been transferred to the transfer material.

23. The image forming apparatus according to claim 21, wherein the control unit is configured to use as the fourth threshold value a rotating time of the rotary member.

24. The image forming apparatus according to claim 1, wherein the control unit is configured to be further capable of performing a third supply operation of supplying the developer to a full surface of the printable area and to determine whether the third supply operation is performed or not on the basis of a determination standard not depending on the printing ratio.

25. The image forming apparatus according to claim 24, wherein the determination standard is to determine whether the third supply operation is performed or not in accordance with the number of prints of the transfer material by which an image has been formed on the transfer material since use of the image forming apparatus has been started.

26. The image forming apparatus according to claim 24, wherein the determination standard is to determine whether the third supply operation is performed when a rotating time of the rotary member is a certain period of time or more.

27. The image forming apparatus according to claim 1, wherein, in the case where the ratio of (1) the area of the printable area of a specified transfer material to (2) the area of the printable area of the transfer material having the widest width in the direction orthogonal to the direction of rotation of the rotating member among user-specifiable transfer materials is defined as an area ratio, the printing ratio is a value obtained by integrating the area ratio into the ratio of the amount of toner used for the printable area in the printable area of the specified transfer material.

* * * * *